US008238211B2

(12) United States Patent
Yoneda

(10) Patent No.: US 8,238,211 B2
(45) Date of Patent: *Aug. 7, 2012

(54) INFORMATION PROCESSING DEVICE AND METHOD, INFORMATION PROVIDING SYSTEM, INFORMATION PROCESSING SYSTEM, AND PROGRAM STORING MEDIUM

(75) Inventor: Michiaki Yoneda, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/083,103

(22) Filed: Apr. 8, 2011

(65) Prior Publication Data

US 2011/0182154 A1 Jul. 28, 2011

Related U.S. Application Data

(63) Continuation of application No. 11/209,674, filed on Aug. 24, 2005, now Pat. No. 7,970,855, which is a continuation of application No. 09/690,579, filed on Oct. 17, 2000, now Pat. No. 6,983,314.

(30) Foreign Application Priority Data

Oct. 26, 1999 (JP) .................................... 11-304051
Oct. 26, 1999 (JP) .................................... 11-304052

(51) Int. Cl.
*G11B 27/36* (2006.01)
*G06F 15/16* (2006.01)
(52) U.S. Cl. .................. 369/53.31; 369/30.04; 709/217
(58) Field of Classification Search ................ 369/30.05, 369/84, 47.1, 47.15, 53.31, 53.34, 47.12, 369/85, 30.04; 347/262; 715/809; 709/217, 709/219, 227, 203; 358/1.6

See application file for complete search history.

(56) References Cited

U.S. PATENT DOCUMENTS

| 4,817,075 A | * | 3/1989 | Kikuchi et al. | ............ 369/47.13 |
| 5,008,875 A | * | 4/1991 | Tomoda et al. | ................ 369/85 |
| 5,518,325 A | | 5/1996 | Kahle | |
| 5,592,511 A | | 1/1997 | Schoen et al. | |

(Continued)

FOREIGN PATENT DOCUMENTS

JP 6-337871 12/1994

(Continued)

OTHER PUBLICATIONS

Office Action issued Aug. 1, 2011 in Japan Application No. 2010-021424.

(Continued)

*Primary Examiner* — Thang Tran
(74) *Attorney, Agent, or Firm* — Oblon, Spivak, McClelland, Maier & Neustadt, L.L.P.

(57) ABSTRACT

A recording apparatus records music on a recording medium. The recording apparatus may access a music piece purchasing data base and select music to be recorded on the recording medium from the music piece purchasing data base. A total playing time of the selected music is calculated. Further, a remaining recording time of the recording medium is calculated, the remaining recording time being the recording capacity of the recording media before the selected music is recorded on the recording medium. Then, it is judged whether or not the total playing time of the selected music is greater than the remaining recording time. A warning is issued when it is judged that the total playing time is greater than the remaining recording time.

19 Claims, 36 Drawing Sheets

U.S. PATENT DOCUMENTS

| | | |
|---|---|---|
| 5,592,596 A | 1/1997 | Balsom |
| 5,611,066 A | 3/1997 | Keele et al. |
| 5,621,864 A | 4/1997 | Benade et al. |
| 5,625,610 A | 4/1997 | Hiranuma |
| 5,633,839 A | 5/1997 | Alexander et al. |
| 5,740,134 A | 4/1998 | Peterson |
| 5,900,608 A | 5/1999 | Iida |
| 5,909,638 A | 6/1999 | Allen |
| 5,930,768 A | 7/1999 | Hooban |
| 5,974,004 A | 10/1999 | Dockes et al. |
| 5,978,551 A | 11/1999 | Koyama |
| 6,011,758 A | 1/2000 | Dockes et al. |
| 6,023,705 A | 2/2000 | Bellinger et al. |
| 6,032,130 A | 2/2000 | Alloul et al. |
| 6,041,703 A | 3/2000 | Salisbury et al. |
| 6,086,380 A | 7/2000 | Chu et al. |
| 6,091,686 A | 7/2000 | Caffarelli et al. |
| 6,137,642 A * | 10/2000 | Inoue .............................. 369/84 |
| 6,172,948 B1 | 1/2001 | Keller et al. |
| 6,182,565 B1 | 2/2001 | Takayama et al. |
| 6,243,725 B1 | 6/2001 | Hempleman et al. |
| 6,256,268 B1 | 7/2001 | Kern et al. |
| 6,353,173 B1 | 3/2002 | D'Amato et al. |
| 6,389,399 B1 | 5/2002 | Yasuda |
| 6,393,430 B1 | 5/2002 | Van Ryzin |
| 6,446,080 B1 | 9/2002 | Van Ryzin et al. |
| 6,453,300 B2 | 9/2002 | Simpson |
| 6,496,744 B1 | 12/2002 | Cook |
| 6,507,541 B1 | 1/2003 | Suzuki et al. |
| 6,529,290 B2 | 3/2003 | Inoue et al. |
| 6,587,403 B1 | 7/2003 | Keller et al. |
| 6,587,404 B1 | 7/2003 | Keller et al. |
| 6,597,862 B1 | 7/2003 | Saeki et al. |
| 6,665,784 B2 | 12/2003 | Ihde et al. |
| 6,714,209 B2 | 3/2004 | Van Valer |
| 6,766,426 B1 * | 7/2004 | Sugiyama ..................... 711/154 |
| 7,145,586 B2 | 12/2006 | Anderson et al. |
| 7,289,393 B2 | 10/2007 | Keller et al. |
| 7,970,855 B2 * | 6/2011 | Yoneda ......................... 709/217 |
| 2003/0108708 A1 | 6/2003 | Anderson et al. |
| 2005/0102624 A1 | 5/2005 | McIntyre |

FOREIGN PATENT DOCUMENTS

| | | |
|---|---|---|
| JP | 9-109478 | 4/1997 |
| JP | 9-167179 | 6/1997 |
| JP | 9-190480 | 7/1997 |
| JP | 10-172267 | 6/1998 |
| JP | 10-222537 | 8/1998 |
| JP | 11-66823 | 3/1999 |
| JP | 11-68994 | 3/1999 |
| JP | 11-73418 | 3/1999 |
| JP | 11-134279 | 5/1999 |
| JP | 11-146379 | 5/1999 |
| JP | 11-154218 | 6/1999 |
| JP | 11-176144 | 7/1999 |
| JP | 11-232365 | 8/1999 |
| JP | 11-259971 | 9/1999 |
| JP | 11-288556 | 10/1999 |

OTHER PUBLICATIONS

Okachi Tazawa, Listen More, MP3, Nikkei WinPC, Japan, Nikkei BP, vol. 5, No. 10, Oct. 1, 1999, pp. 200-203.

Office Action issued Dec. 16, 2010, in Japanese Patent Application No. 11-304052 with English translation.

Office Action issued Nov. 18, 2010, in Japan Patent Application No. 2010-021424.

Office Action issued May 26, 2011, in Japan Patent Application No. 2010-021424.

* cited by examiner

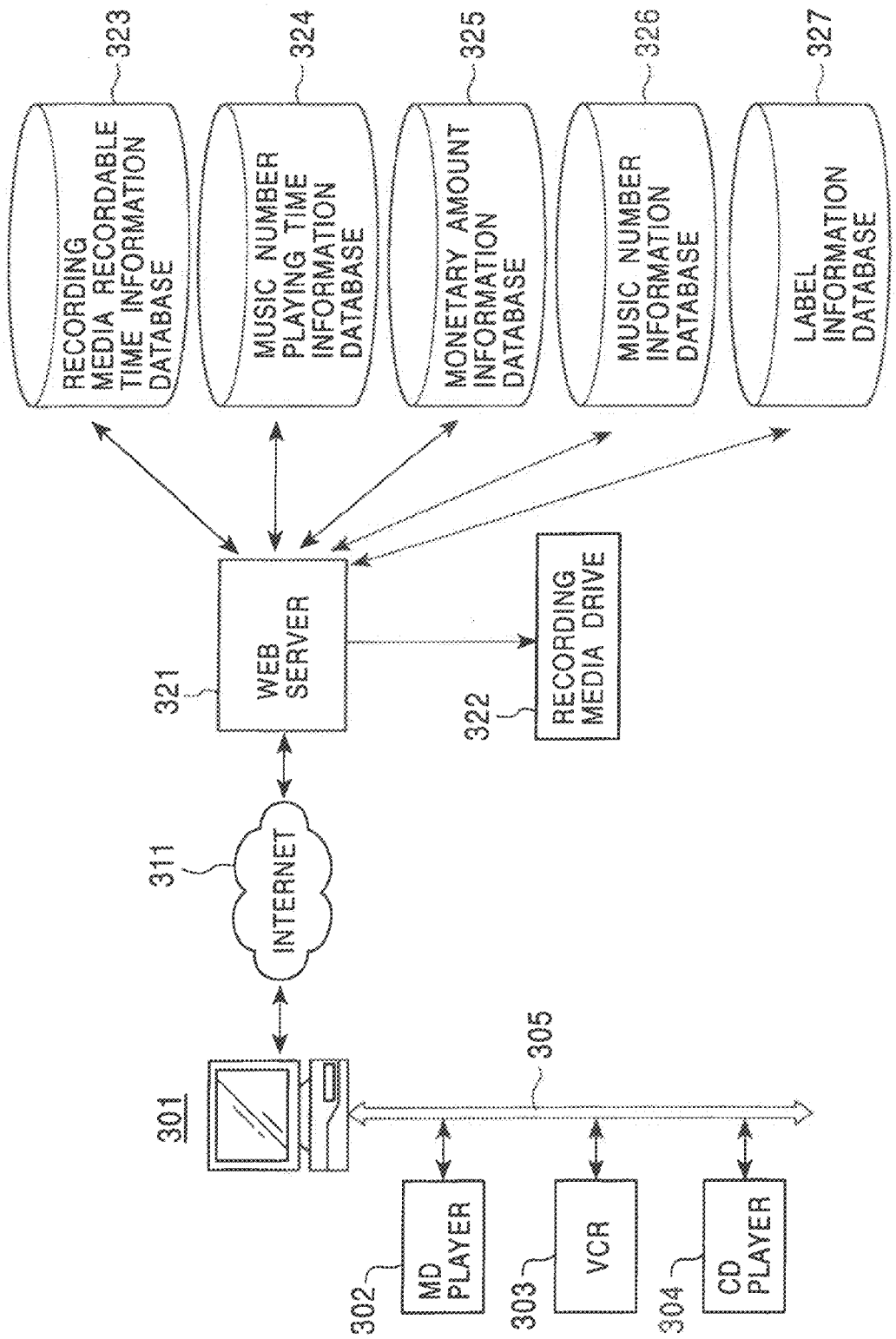

FIG. 2A

| | |
|---|---|
| CD-R | 74 MINUTES |
| MD | 74 MINUTES |

FIG. 2B

| | MP3 | ATRAC3(SP) | ATRAC3(LP) |
|---|---|---|---|
| MS16M | 16 MINUTES | 20 MINUTES | 32 MINUTES |
| MS64M | 64 MINUTES | 81 MINUTES | 128 MINUTES |

FIG. 35

XXXX MUSIC MEDIA RECORDING TIME CALCULATING SERVICE

MUSIC MEDIA RECORDING TIME CALCULATING SERVICE

● MEDIA FOR RECORDING ON:
CD (TIME CAPABLE OF RECORDING: 74 MIN. 00 SEC.) — 462

| MUSIC PIECE NO. | TITLE (463) | ARTIST (464) | PLAYING TIME (465) | (466) |
|---|---|---|---|---|
| 1 | AAA | ICHIRO YAMADA | 4 MIN. 54 SEC. | |
| 2 | BBB | KAZUKO YAMADA | 3 MIN. 12 SEC. | |
| 3 | OOO | ICHIRO YAMADA | 68 MIN. 06 SEC. | |
| 4 | | | | |
| 5 | | | | |
| 6 | | | | |
| 7 | | | | |
| 8 | | | | |
| 9 | | | | |
| 10 | | | | |

TOTAL TIME  76 MIN. 12 SEC. — 467
REMAINING TIME  -2 MIN. 12 SEC. — 468

— 469

THE TOTAL TIME OF SELECTED MUSIC PIECES HAS EXCEEDED TIME CAPABLE OF RECORDING — 481

461

INFORMATION PROCESSING DEVICE AND METHOD, INFORMATION PROVIDING SYSTEM, INFORMATION PROCESSING SYSTEM, AND PROGRAM STORING MEDIUM

CROSS-REFERENCE TO RELATED APPLICATION

This application is a continuation of U.S. application Ser. No. 11/209,674, filed Aug. 24, 2005, which is a continuation of U.S. application Ser. No. 09/690,579, filed Oct. 17, 2000, the entire contents of which are hereby incorporated herein by reference. This application claims priority under 35 U.S.C. 119 to Japanese Application Nos. 11-304051, filed Oct. 26, 1999 and 11-304052, filed Oct. 26, 1999.

BACKGROUND OF THE INVENTION

1. Field of the Invention

The present invention relates to an information processing device and method, an information providing device and method, and information providing system, and program storing medium, and particularly to an information processing device and method, an information providing device and method, an information providing system, and program storing medium, wherein information can be effectively recorded on a recording medium with limited capacity.

2. Description of the Related Art

Recently, system which use networks, of which the Internet is most prominent, to provide services of various types, are becoming widespread. For example, with such systems, consumers can purchase various types of products via the network. In the event that the product (service) to be purchased is music information for example, the user can directly receive the music data via the network, and record this to an MD (mini-disk) or the like.

However, in the event that the user attempts to record the music information on an MD for example, the size of music data becomes great according to the size of that musical piece or the number of musical pieces, exceeding the recording capacity of the MD, thereby preventing recording the desired piece to the MD in a speedy and sure manner.

Also, in the event that the user obtains as recording medium which the user personally edited, conventionally the user created the label (jacket) to be applied to the recording medium either by hand, or with a word processor or the like. Not only is this troublesome, but the user might write the label incorrectly, or even if the label is correct there is an unmistakable handmade impression to the label, which would make one hesitate in giving such an article to a friend for a present, for example.

SUMMARY OF THE INVENTION

The present invention has been made in light of such, and accordingly, it is an object thereof to allow recording of information to be made to a recording medium in a speedy and sure manner.

It is another object of the present invention to allow the user to obtain a label printed neatly and accurately, quickly and easily.

To this end, according to one aspect of the present invention, an information processing device connected to other information processing devices via a network, comprises information specifying means for specifying information of which providing is to be received, notifying means for notifying the other information processing devices via the network of the information specified by the information specifying means, obtaining means for obtaining capacity information relating to the capacity of the information notified by the notifying means from the other information processing devices via the network, display control means for controlling display of the capacity information obtained by the obtaining means, and requesting means for requesting the other information processing devices to record the information specified by the information specifying means to a recording medium.

The information processing device may further comprise recording medium specifying means for specifying the recording medium.

The information of which providing is received from the other information processing devices may contain music information, and the capacity information may contain playing time of the music. The recording medium may be a CD-R, MD, or semiconductor memory.

According to another aspect of the present invention, an information processing method for an information processing device connected to other information processing devices via a network, comprises an information specifying step for specifying information of which providing is to be received, a notifying step for notifying the other information processing devices via the network of the information specified by the processing in the information specifying step, an obtaining step for obtaining capacity information relating to the capacity of the information notified by the processing in the notifying step from the other information processing devices via the network, a display control step for controlling display of the capacity information obtained by the processing of the obtaining step, and a requesting step for requesting the other information processing devices to record the information specified by the processing of the information specifying step to a recording medium.

According to still another aspect of the present invention, a computer-readable program, stored in a program storing medium, for controlling an information processing device connected to other information processing devices via a network, comprises an information specifying step for specifying information of which providing is to be received, a notifying step for notifying the other information processing devices via the network of the information specified by the processing in the information specifying step, an obtaining step for obtaining capacity information relating to the capacity of the information notified by the processing in the notifying step from the other information processing devices via the network, a display control step for controlling display of the capacity information obtained by the processing of the obtaining step, and a requesting step for requesting the other information processing devices to record the information specified by the processing of the information specifying step to a recording medium.

According to further aspect of the present invention, an information processing device connected to other information processing devices via a network, comprises first obtaining means for obtaining specifying information which specifies provided information, from the other information processing devices via the network, second obtaining means for obtaining capacity information relating to the capacity of the provided information corresponding to the specifying information obtained by the first obtaining means, notifying means for notifying the other information processing devices via the network of the capacity information obtained by the second obtaining means, third obtaining means for obtaining the provided information corresponding to the specifying information obtained by the first obtaining means, and recording means for recording the provided information obtained by the third obtaining means to recording medium.

The information processing device may further comprise fourth obtaining means for obtaining specifying information specifying the recording medium from the other information processing devices via the network.

The information processing device may also further comprise computing means for computing the total of the capacity of the provided information corresponding to the specifying information obtained by the first obtaining means, wherein the notifying means notifies the other information processing devices of the total of the capacity of the provided information, computed by the computing means.

The computing means may further compute the remaining time wherein the provided information corresponding to the specifying information obtained by the first obtaining means can be recorded on the recording medium, and the notifying means may also notify the other information processing devices of the total capacity of the provided information and time capable of recording, computed by the computing means.

The provided information to be provided to the other information processing devices may contain music information, and the capacity information may contain playing time of the music. The recording medium may be a CD-R, MD, or semiconductor memory.

According to yet further aspect of the present invention, an information processing method for an information processing device connected to other information processing devices via a network, comprises a first obtaining step for obtaining specifying information which specifies provided information, from the other information processing devices via the network, a second obtaining step for obtaining capacity information relating to the capacity of the provided information corresponding to the specifying information obtained by the processing of the first obtaining step, a notifying step for notifying the other information processing devices via the network of the capacity information obtained by the processing of the second obtaining step, a third obtaining step for obtaining the provided information corresponding to the specifying information obtained by the processing of the first obtaining step, and a recording step for recording the provided information obtained by the processing of the third obtaining step to a recording medium.

According to yet further aspect of the present invention, a computer-readable program, stored in a program storing medium, for controlling an information processing device connected to other information processing devices via a network, comprises a first obtaining step for obtaining specifying information which specifies provided information, from other information processing devices via the network, a second obtaining step for obtaining capacity information relating to the capacity of the provided information corresponding to the specifying information obtained by the processing of the first obtaining step, a notifying step for notifying the other information processing devices via the network of the capacity information obtained by the processing of the second obtaining step, a third obtaining step for obtaining the provided information corresponding to the specifying information obtained by the processing of the first obtaining step, and a recording step for recording the provided information obtained by the processing of the third obtaining step to a recording medium.

According to yet further aspect of the present invention, an information providing system comprises a first information processing device and a second information processing device which are mutually connected via a network, the first information processing device comprising information specifying means for specifying provided information, first notifying means for notifying the second information processing device via the network of the provided information specified by the information specifying means, first obtaining means for obtaining capacity information relating to the capacity of the provided information notified by the first notifying means from the second information processing device via the network, display control means for controlling display of the capacity information obtained by the first obtaining means, and requesting means for requesting the second information processing device to record the provided information specified by the information specifying means to a recording medium, and the second information processing device comprising second obtaining means for obtaining specifying information which specifies the provided information, from the first information processing device via the network, third obtaining means for obtaining capacity information relating to the capacity of the provided information corresponding to the specifying information obtained by the second obtaining means, second notifying means for notifying the first information processing device via the network of the capacity information obtained by the third obtaining means, fourth obtaining means for obtaining the provided information corresponding to the specifying information obtained by the second obtaining means, and recording means for recording the provided information obtained by the fourth obtaining means to the recording medium.

According to yet further aspect of the present invention, an information processing device connected to other information processing devices via a network, comprises transmitting means for transmitting specifying information for specifying information for which notification of capacity is desired, to the other information processing devices via the network, obtaining means for obtaining capacity information relating to the capacity of the information corresponding to the specifying information transmitted by the transmitting means, from the other information processing devices via the network, and display control means for controlling the display of the capacity information obtained by the obtaining means.

The information processing device may further comprise recording medium specifying means for specifying a recording medium for recording the information specified by the specifying information, wherein the transmitting means also transmits the recording medium specified by the recording medium specifying means to the other information processing devices. The recording medium may be a CD-R, MD, or semiconductor memory.

The information specified by the specifying information may contain music information, and the capacity information may contain playing time of the music.

According to yet further aspect of the present invention, an information processing method for an information processing device connected to other information processing devices via a network, comprises a transmitting step for transmitting specifying information for specifying information for which notification of capacity is desired, to the other information processing devices via the network, an obtaining step for obtaining capacity information relating to the capacity of the information corresponding to the specifying information transmitted by the processing of the transmitting step, from the other information processing devices via the network, and a display control step for controlling the display of the capacity information obtained by the processing of the obtaining step.

According to yet further aspect of the present invention, a computer-readable program, stored in a program storing medium, for controlling an information processing device connected to other information processing devices via a network, comprises a transmitting step for transmitting specifying information for specifying information for which notification of capacity is desired, to the other information processing devices via the network, an obtaining step for obtaining capacity information relating to the capacity of the information corresponding to the specifying information transmitted by the processing of the transmitting step, from the other information processing devices via the network, and a display control step for controlling the display of the capacity information obtained by the processing of the obtaining step.

According to yet further aspect of the present invention, an information processing device connected to other information processing devices via a network, comprises first obtaining means for obtaining specifying information for specifying the information regarding which notification of capacity is desired, from the other information processing devices via the network, second obtaining means for obtaining capacity information relating to the capacity of the information corresponding to the specifying information obtained by the first obtaining means, and notifying means for notifying the capacity information obtained by the second obtaining means to the other information processing devices via the network.

The information processing device may further comprise third obtaining means for obtaining specifying information for specifying a recording medium for recording information for which notification of capacity is desired, from the other information processing devices via the network. The recording medium may be a CD-R, MD, or semiconductor memory.

The information processing device may further comprise computing means for computing the total of the capacity of the information for which notification of capacity is desired corresponding to the specifying information obtained by the first obtaining means, and the remaining time wherein the information for which notification of capacity is desired corresponding to the specifying information obtained by the first obtaining means can be recorded on the recording medium, wherein the notifying means notifies the total of the capacity of the information for which notification of capacity is desired which has been computed by the computing means, and also the remaining time wherein the information can be recorded on the recording medium, to the other information processing devices.

The information processing device may further comprise computing means for computing the total of the capacity of the information for which notification of capacity is desired corresponding to the specifying information obtained by the first obtaining means, wherein the notifying means also notifies the total of the capacity of the information for which notification of capacity is desired, which has been computed by the computing means, to the other information processing devices.

The information of which notification of capacity is desired may contain music information, and the capacity information may contain playing time of the music.

According to yet further aspect of the present invention, an information processing method for an information processing device connected to other information processing devices via a network, comprises a first obtaining step for obtaining specifying information for specifying the information regarding which notification of capacity is desired, from the other information processing devices via the network, a second obtaining step for obtaining capacity information relating to the capacity of the information corresponding to the specifying information obtained by the processing of the first obtaining step, and a notifying step for notifying the capacity information obtained by the processing of the second obtaining step to the other information processing devices via the network.

According to yet further aspect of the present invention, a computer-readable program, stored in a program storing medium, for controlling an information processing device connected to other information processing devices via a network, comprises a first obtaining step for obtaining specifying information for specifying the information regarding which notification of capacity is desired, from the other information processing devices via the network, a second obtaining step for obtaining capacity information relating to the capacity of the information corresponding to the specifying information obtained by the processing of the first obtaining step, and a notifying step for notifying the capacity information obtained by the processing of the second obtaining step to the other information processing devices via the network.

According to yet further aspect of the present invention, an information system comprises a first information processing device and a second information processing device mutually connected via a network, the first information processing device comprising transmitting means for transmitting specifying information for specifying information for which notification of capacity is desired, to the second information processing device via the network, first obtaining means for obtaining capacity information relating to the capacity of the information corresponding to the specifying information transmitted by the transmitting means, from the second information processing device via the network, and display control means for controlling the display of the capacity information obtained by the first obtaining means, and the second information processing device comprising second obtaining means for obtaining specifying information for specifying the information regarding which notification of capacity is desired, from the first information processing device via the network, third obtaining means for obtaining capacity information relating to the capacity of the information corresponding to the specifying information obtained by the second obtaining means, and notifying means for notifying the capacity information obtained by the third obtaining means to the first information processing device via the network.

With the information processing apparatus according to the first aspect, the information processing method according to the second aspect, and the program stored in the program storing medium according to the third aspect, capacity information of the capacity of information to be provided is obtained from another information processing device and displayed. Request of recording of given information to a recording medium is made based on this display.

With the information processing apparatus according to the fourth aspect, the information processing method according to the fifth aspect, and the program stored in the program storing medium according to the sixth aspect, capacity information corresponding to the capacity of specified provided information is obtained and notified to other information processing devices via the network. The provided information corresponding to the specified information is recorded on the recording medium.

With the information processing system according to the seventh aspect, a first information processing device specifies provided information, and notifies this to a second information processing device. The second information processing device obtains capacity information of the capacity of provided information notified from the first information processing device and notifies this to the first information processing device. The first information processing device controls the display of the capacity information, and requests the second information processing device to record the specified information to the recording medium. The second information processing device records the provided information on the recording medium, based on this request.

With the information processing apparatus according to the eighth aspect, the information processing method according to the ninth aspect, and the program stored in the program storing medium according to the tenth aspect, specifying information for specifying information regarding which notification of capacity is desired is transmitted to other information processing devices, and capacity information relating to the capacity of information corresponding to the specified information transmitted from other information processing apparatuses is obtained and displayed.

With the information processing apparatus according to the eleventh aspect, the information processing method according to the twelfth aspect, and the program stored in the program storing medium according to the thirteenth aspect, specifying information for specifying information regarding which notification of capacity is desired is obtained from other information processing apparatuses, and capacity information corresponding thereto is obtained. The obtained capacity information is notified to other information processing devices.

With the information processing system according to the fourteenth aspect, a first information processing device transmits specifying information for specifying information regarding which notification of capacity is desired to a second information processing device, and the second information processing device obtains the capacity information relating to that information and notifies this to the first information processing device.

According to yet further aspect of the present invention, an information processing device comprises first obtaining means for obtaining GUI data for specifying label printing conditions for applying to a recording medium from the other information processing devices via the network, display control means for controlling the display of GUI based on the GUI data obtained by the first obtaining means, second obtaining means for obtaining conditions input based on the GUI regarding which the display thereof is controlled by the display control means, and requesting means for requesting printing of the label, to the other information processing devices via the network, under the printing conditions obtained by the second obtaining means.

According to yet further aspect of the present invention, an information processing method for an information processing device comprises a first obtaining step for obtaining GUI data for specifying label printing conditions for applying to a recording medium from the other information processing devices via the network, a display control step for controlling the display of GUI based on the GUI data obtained by the processing of the first obtaining step, a second obtaining step for obtaining conditions input based on the GUI regarding which the display thereof is controlled by the processing of the display control step, and a requesting step for requesting printing of the label, to the other information processing devices via the network, under the printing conditions obtained by the processing of the second obtaining step.

According to yet further aspect of the present invention, a program stored in a program storing medium comprises a first obtaining step for obtaining GUI data for specifying label printing conditions for applying to a recording medium, from the other information processing devices via the network, a display control step for controlling the display of GUI based on the GUI data obtained by the processing of the first obtaining step, a second obtaining step for obtaining conditions input based on the GUI regarding which the display thereof is controlled by the processing of the display control step, and a requesting step for requesting printing of the label, to the other information processing devices via the network, under the printing conditions obtained by the processing of the second obtaining step.

According to yet further aspect of the present invention, an information processing device comprises transmitting means for transmitting data of GUI specifying label printing conditions for a label for applying to a recording medium, to the other information processing devices via the network, obtaining means for obtaining conditions input based on the GUI from the other information processing devices via the network, and printing means for printing the label under the printing conditions obtained by the obtaining means, in the event that there is a request for printing the label, from the other information processing devices via the network.

According to yet further aspect of the present invention, an information processing method comprises a transmitting step for transmitting data of GUI specifying label printing conditions for applying to a recording medium, to the other information processing devices via the network, an obtaining step for obtaining conditions input based on the GUI from the other information processing devices via the network, and a printing step for printing the label under the printing conditions obtained by the processing in the obtaining step, in the event that there is a request for printing the label, from the other information processing devices via the network.

According to yet further aspect of the present invention, a program stored in a program storing medium comprises a transmitting step for transmitting data of GUI specifying label printing conditions for applying to a recording medium, to the other information processing devices via the network, an obtaining step for obtaining conditions input based on the GUI from the other information processing devices via the network, and a printing step for printing the label under the printing conditions obtained by the processing in the obtaining step, in the event that there is a request for printing the label, from the other information processing devices via the network.

According to yet further aspect of the present invention, an information processing system comprises a first information processing device and a second information processing device connected via a network, the first information processing device comprising first obtaining means for obtaining GUI data for specifying label printing conditions for applying to a recording medium from the second information processing device via the network, display control means for controlling the display of GUI based on the GUI data obtained by the first obtaining means, second obtaining means for obtaining conditions input based on the GUI regarding which the display thereof is controlled by the display control means, and requesting means for requesting printing of the label, to the second information processing device via the network, under the printing conditions obtained by the second obtaining means, and the second information processing device comprising transmitting means for transmitting data of GUI specifying label printing conditions for applying to a recording medium, to the first information processing device via the network, third obtaining means for obtaining conditions input based on the GUI from the first information processing device via the network, and printing means for printing the label under the printing conditions obtained by the third obtaining means, in the event that there is a request for printing the label, from the first information processing device via the network.

With the information processing apparatus according to the fifteenth aspect, the information processing method according to the sixteenth aspect, and the program stored in the program storing medium according to the seventeenth aspect, GUI data specifying the printing conditions of the label is obtained and displayed by other information processing devices via the network, and printing of the label is requested of other information processing devices under the input conditions.

With the information processing apparatus according to the eighteenth aspect, the information processing method according to the nineteenth aspect, and the program stored in the program storing medium according to the twentieth aspect, GUI data specifying the printing conditions of the label to be applied to the recording medium is transmitted to other information processing devices, information conditions input based on the GUI are obtained from other information processing devices, and printed on the label.

With the information processing system according to the twenty-first aspect, GUI based on the GUI data specifying the printing conditions obtained via the network from the second information processing device is displayed in the first information processing device, conditions input based on the GUI are transmitted to the second information processing device, and printed on the label.

BRIEF DESCRIPTION OF THE DRAWINGS

FIG. 1 is a block diagram illustrating a configuration example of a networking system to which the present invention is applied;

FIGS. 2A and 2B are diagrams illustrating an example of the recording contents of the recording media recordable time information database shown in FIG. 1;

FIG. 35 is a diagram illustrating a display example of the calculating page of the client shown in FIG. 1;

DETAILED DESCRIPTION OF THE PREFERRED EMBODIMENTS

Figure 3:
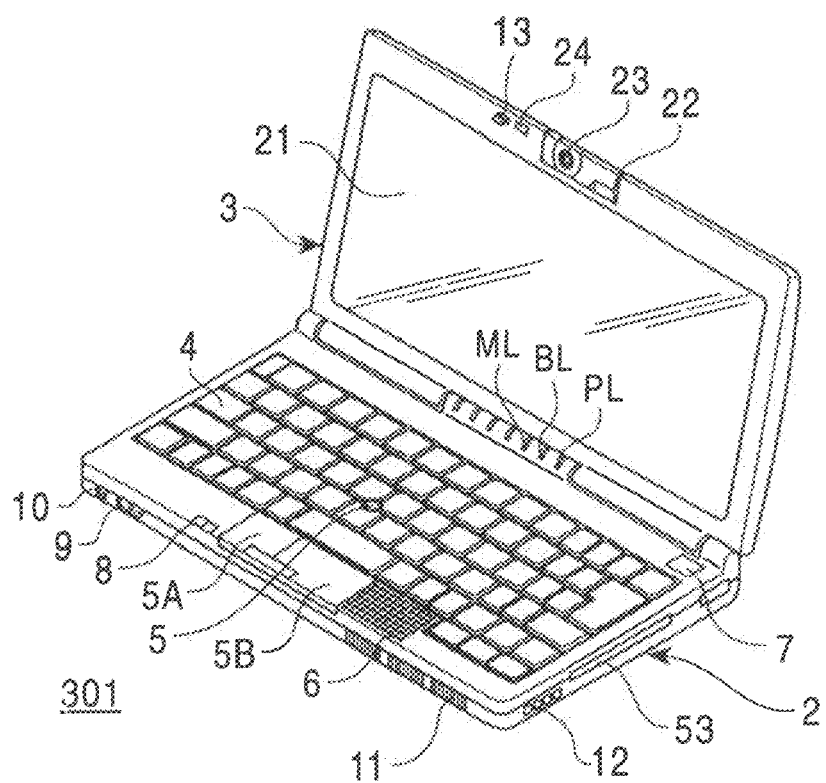
FIG. 3 is a perspective view illustrating the configuration of the external view of the client shown in FIG. 1.

The following is a description of an embodiment of the present invention, with reference to the drawings. FIG. 1 represents a configuration example of a network system to which the present invention has been applied. With this network system, a client 301 is connected to a Web server 321 via the Internet 311. Also, the client 301 is also connected to an IEEE (Institute of Electrical and Electronic Engineers) 1394 serial bus 305, and further connected to this IEEE1394 serial bus (hereafter referred to simply as "1394 serial bus") 305 is an MD (mini-disk) player 302, a video cassette recorder (VCR) 303, and a CD (compact disk) player 304.

A recording media drive 322 is connected to the Web server 321, for recording music data to recording media such as CD-R (Compact Disk Recordable), mini-disks, Memory Stick (Registered Trademark), etc. Also connected to the Web server 321 is a recording media recordable time information database (DB) 323 which stores information relating to the capacity (recordable time) which each type of recording media has, a music piece playing time information database 324 for storing information relating to the playing time of music pieces, monetary amount information database 325 storing information relating to the monetary amount for purchasing the music piece, music piece database 326 for storing music piece data, and a label information database 327 recording information relating labels to be applied to the recording media. Note that the recordable time information database 323, music piece playing time information database 324, monetary amount information database 325, music piece database 326, and label information database 327, may be directly connected to the Web server 321, or connected via a network including the Internet 311.

FIG. 2 represents an example of the recordable time information recorded in the recording media recordable time information database 323. As shown in FIG. 2A, the recordable time is set at 74 minutes for both the CD-R and mini-disk (MD) serving as recording media. Also, as shown in FIG. 2B. Also, different recordable times are stored for the Memory Stick Walkman (MS) (Registered Trademark), according to the capacity (16 Mbytes or 64 Mbytes) and according to the music piece data compression method. The recording capacity of the MS16M is 16 minutes in the event that the compression method is MP3 (MPEG (Moving Picture Expert Group) Audio Layer-3), 20 minutes in the event of ATRAC3 (Adaptive Transform Acoustic Coding) (SP (Standard Play)), and 32 minutes in the event of ATRAC3 (LP (Long Play). Also, the recording capacity of the MS46M having four times that of the MS16M is 64 minutes in the event that the compression method is MP3, 81 minutes in the event of ATRAC3 (SP), and 128 minutes in the event of ATRAC3 (LP).

Next, a configuration example of the client 301 will be described with reference to FIGS. 3 through 7. The client 301 is a portable-type personal computer which is of a size equal to or smaller than a 5 B size, easily portable, and is configured of a main unit 2 and a display unit 3 attached to the main unit 2 so as to open and close.

The main unit 2 is provided on the upper side thereof with multiple operating keys 4 which are operated at the time of inputting characters, symbols, and numerals, a stick-type pointing device 5 operated at the time of moving the cursor displayed on the display unit 3, an internal speaker 6, and a shutter button 7 operated at the time of taking images with a CCD (Charge Coupled Device) camera 23 provided to the display unit 3.

A liquid crystal display 21 made up of an LCD (Liquid Crystal Display) is provided at the front of the display unit 3, and an imaging unit 22 having a CCD camera 23 at the uppermost center portion of the front is rotatably attached to the display unit 3.

Figure 4:
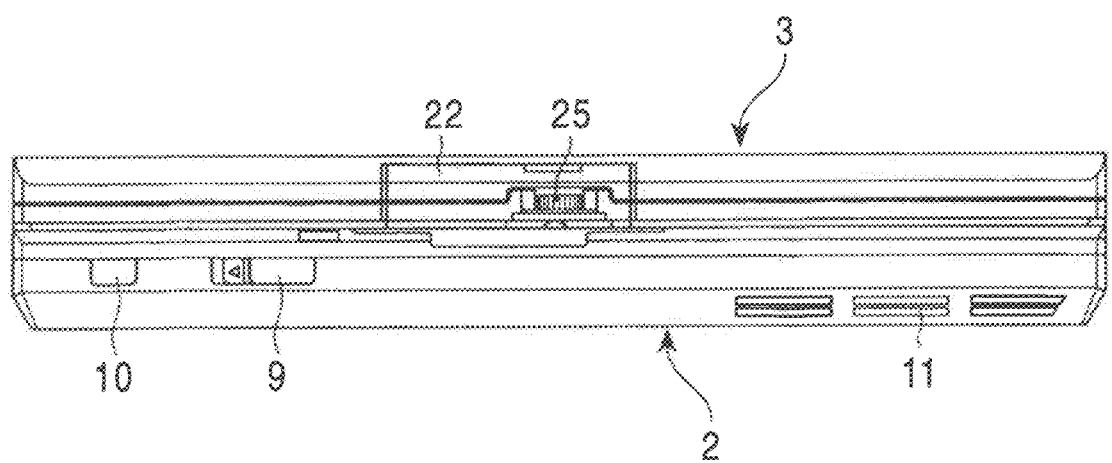
FIG. 4 is a frontal view illustrating the configuration of the front side of the client shown in FIG. 1 with the display unit closed.

That is to say, the imaging unit 22 is arranged to as to be positioned in an arbitrary direction by rotating in a 180□< angle range between the front direction of the display unit 3 and the rear direction thereof. Also, as shown in FIG. 4, adjusting rings 25 are provided for adjusting the focus of the CCD camera 23.

A microphone 24 is provided at the front of the display unit 3 (FIG. 3) at the left edge of the image unit 22, so sound can be recorded from the rear side of the display unit 3 (FIG. 7) as well, via the microphone.

Also, LEDs (Light-Emitting Diodes) serving as a power lamp PL, battery lamp BL, message lamp ML, and other lamps corresponding to various uses, are provided at the center lower side of the front of the display unit 3.

Also, a claw 13 is provided to the left edge of the microphone 24 at the upper side of the front of the display unit 3, and also a hole 8 is provided at two predetermined positions on the main unit 2, so as to correspond to the claw 13. Thus, closing the display unit 3 onto the main unit 2 causes the claw 13 to engage the hole 8, and lock the units.

A slide lever 9 is provided to the front side of the main unit 2 as shown in FIG. 4, and sliding the slide lever 9 in the direction of the arrow (to the left in FIG. 4) along the front side disengages the locked state of the claw 13 fit to the hole 8, thus allowing the display unit 3 to be opened as to the main unit 2.

Also, provided to the front side of the main unit 2 toward the left edge is a programmable power key (PPK) for automatically executing a preset series of actions, by turning the power on and activating predetermined application software (hereafter referred to simply as "application"). Also, multiple breather holes 11 are provided at the right edge side.

Figure 5:
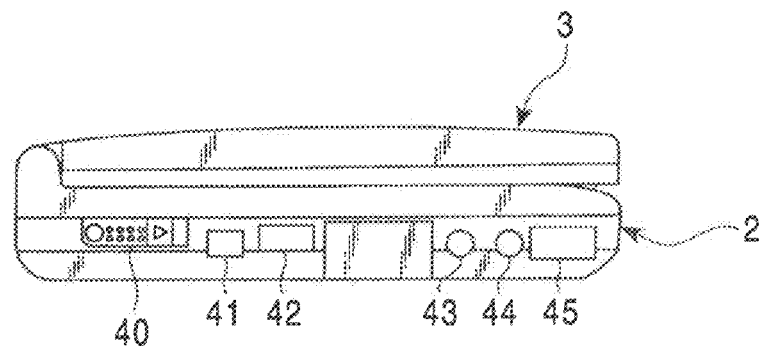
FIG. 5 is a left side view illustrating the configuration of the left side of the client shown in FIG. 1 with the display unit closed.

As shown in FIG. 5, provided to the left side of the main unit are a slide-type power switch 40, a 4-pin IEEE (Institute of Electrical and Electronics Engineers) 1394 terminal 41, USB (Universal Serial Bus) terminal 42, microphone input terminal 43, headphone terminal 44, and IrDa (Infrared Data Association) compatible infrared port 45.

Figure 6:
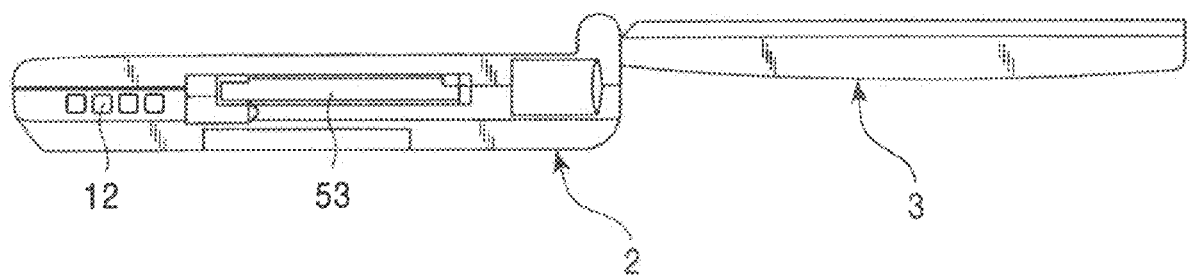
FIG. 6 is a right side view illustrating the configuration of the right side of the client shown in FIG. 1 with the display unit open.

As shown in FIG. 6, an exhaust hole 12 is provided to the right side of the main unit 2, and next to the exhaust hole 12 to the right is provided a PC card slot 53 for inserting a PCMCIA (Personal Computer Memory Card International Association) card (hereafter referred to simply as "PC card").

Figure 7:
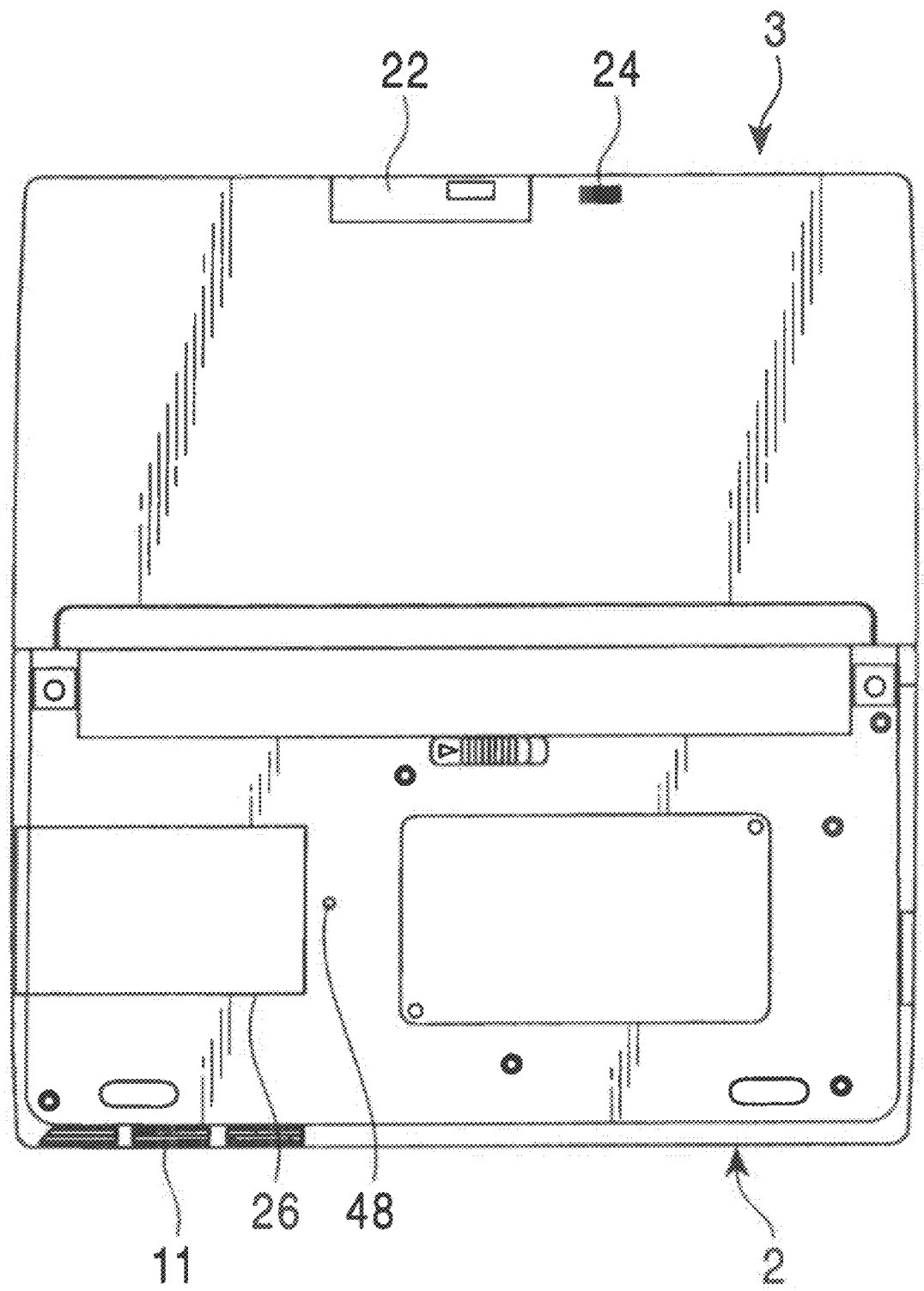
FIG. 7 is a bottom side view illustrating the configuration of the bottom side of the client shown in FIG. 1 with the display unit open.

Also, as shown in FIG. 7, a lid 26 for covering the opening portion for attaching extra memory is provided to the lower side of the main unit 2, along with a pin-inserting hole 48 for disengaging the locking claw of the lid 26.

Figure 8:
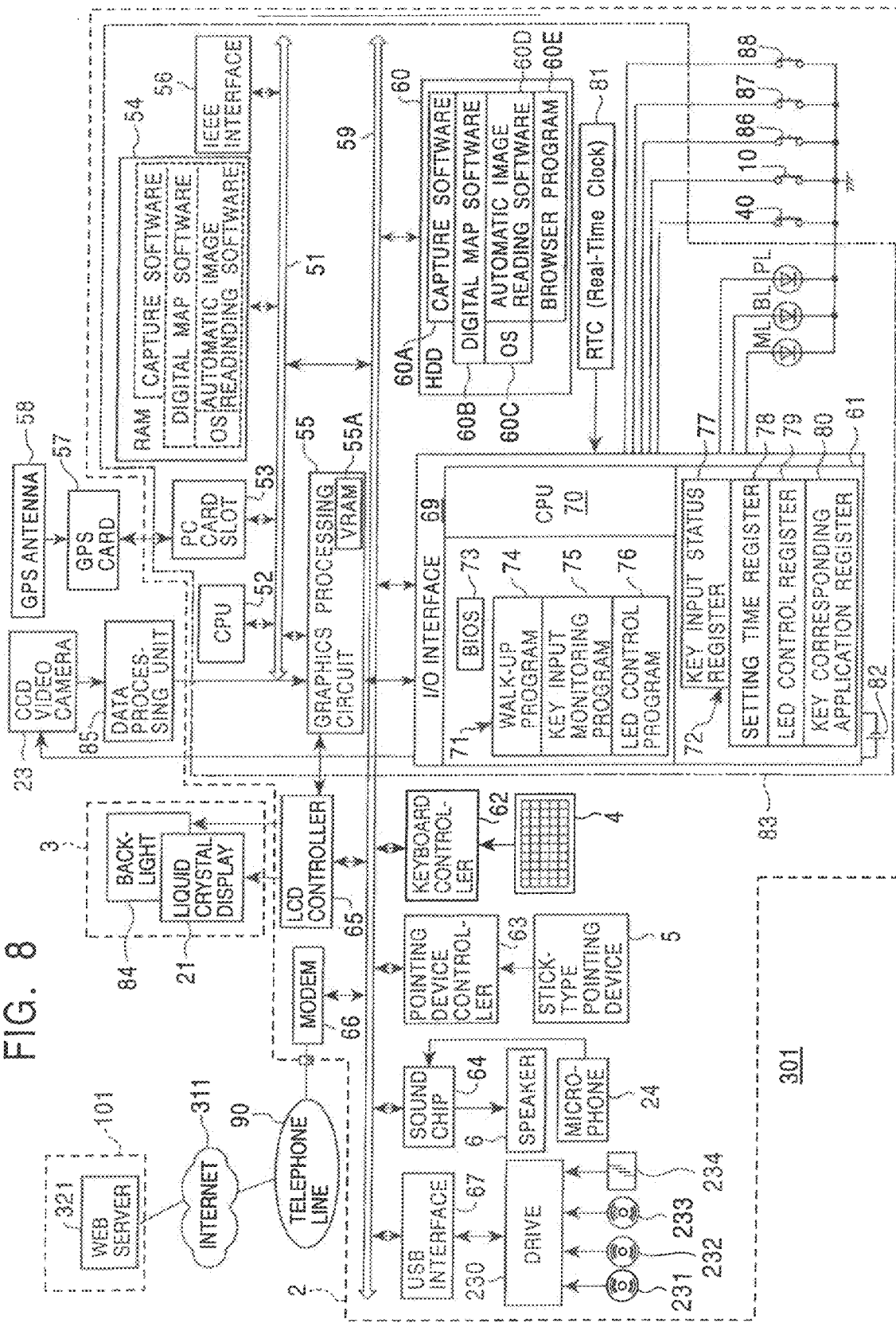
FIG. 8 is a block diagram illustrating a configuration example of the interior of the client shown in FIG. 1.

FIG. 8 shows the electrical configuration of the interior of the client 301. As shown in FIG. 8, at the main unit 2 of the client 301, a CPU (Central Processing Unit) 52, PC (Personal Computer) card slot 53, RAM (Random Access Memory) 54, a graphics processing circuit 55 for generating images to be displayed on the liquid crystal display of the display unit 3, and an IEEE interface 56 directly connected to an IEEE terminal 41 for connecting to other computer devices and other external devices to take in digital data, are connected to a PCI (Peripheral Component Interconnect) bus 51 of the activation sequence control unit 83.

The CPU 52 is a controller for centrally controlling the functions of the main unit 2, and is arranged so as to be able to execute the various functions by executing various programs loaded to the RAM 54.

The PCI bus 51 is connected to an ISA (Industrial Standard Architecture) bus 59 and connected to the ISA bus 59 are a hard disk drive 60, an I/O (Input/Output) controller 61, a keyboard controller 62, a pointing device controller 63, a sound chip 64, an LCD controller, a modem 66, and a USB interface 67.

Now, the keyboard controller 62 controls input of control signal according to the pressing of the operating key 4 (FIG. 3), and the pointing device controller 63 controls input of control signals from the stick-type pointing device 5 (FIG. 3).

The sound chip 64 either takes in audio input from the microphone 24 (FIG. 3), or supplies audio signals to the internal speaker (FIG. 3). The modem 66 is connected to the WWW server 102 of the provider 101 via a public telephone line 90 and the Internet 311. Note that the USB interface 67 is connected to the USB terminal 42, so as to connect peripheral equipment such as a USB mouse, floppy disk drive, and so forth. In this example, a drive 230 for driving a magnetic disk 231, optical disk 232, magneto-optical disk 233, or semiconductor memory 234, is connected.

The hard disk drive 60 stores capturing software 60A for capturing still images, digital map software 60B, an operating system 60C which is Windows 98 (registered trademark), automatic image reading software 60D for automatically reading in and storing images taken by the CCD camera 23, a browser program 60E which controls communication Web server 321 via the Internet 311, and also various types of application software (not shown), and the software is read out from the CPU 52 and loaded to the RAM 54 as necessary.

The I/O controller 61 is mutually connected with the I/O interface 69, CPU 70, ROM (Read-Only Memory) 71, made up of EEPROM (Electrically Erasable and Programmable Read-Only Memory), and RAM 72, and he current time is constantly supplied by a RTC (Real-Time Clock) 81.

Stored to the ROM 71 of the I/O controller 61 is a BIOS (Basic Input/Output System) 73, a wake-up program 74, a key input monitoring program 75, and LED controlling program 76, and also a key input status register 77, set time register 78, Led register 79, and key corresponding application register 80, are provided to the RAM.

The key input status register 77 stored in the RAM 72 is arranged so as to be able to store operating key flags, and the CPU 70 monitors whether or not the PPK key 10 (FIG. 3) used for one-touch operations based on the input key monitoring program 75, and in the event that the PPK key 10 has been operated, an operating key flag is stored in the key input status register 77.

Also, the set time register 78 is arranged so as to be capable of storing time information, such as a start time which the user has arbitrarily set, and the CPU 70 detects whether or not the current time provided from the RTC 81 has reached the arbitrarily set start time, based on the wake-up program 74, and if so the CPU 70 executes the predetermined processing.

Further, the key corresponding application register 80 stores the relationship between the operation keys 4 made up of the PPK key 10 or combinations of multiple keys, and the applications to activate, according to the PPK key 10 or combinations of the operating keys 4 made beforehand. In the event that the PPK key 10 or combinations of the operating keys 4 made beforehand are pressed, the CPU 70 sends the control data for activating the corresponding application to the CPU 52, via the ISA bus 59 and PCI bus 51, sequentially, thereby activating the application software according to the control data by the CPU 52.

Also, the LED control register 79 stores and end flag in the event that the application software stored in the key corresponding application register 80 has been activated and operations have ended, and the CPU 70 lights the message lamp ML in the event that detection is made that the end flag is stored in the LED control register 79, based on the LED control program 76.

Now, the LED control register 79 stores a power flag in the event that the power switch has been pressed, and stores a battery flag in the event that the main unit 2 operates on the power voltage supplied from the battery. Accordingly, the CPU 70 lights the power lamp PL or the battery lamp BL in the event that detection is made that a power flag or battery flag is stored, based on the LED control program 76.

Here, a back-up battery 82 is connected to the I/O controller 61, thereby allowing the data of the key input status register 77 stored in the RAM 72, the set time register 78, the LED control register 79, and the key corresponding application register 80, to be held even in the event that the power switch 40 of the main unit 2 is turned off and power is no longer supplied from the unshown power source.

Also, the inversion switch 88 connected to the I/O controller 61 is turned on in the event that the imaging unit 22 (FIG. 3) is rotated 180□< so as to take images in the in the direction opposite to the liquid crystal display 21 of the display unit 3, notifying the CPU 70 of the state thereof. Also, the PPK key 10 notifies the CPU 70 of the state thereof, in the same was as pressing the inversion switch 88.

Further, the half-press switch 86 is turned on in the event that the shutter button 7 provided on the upper side of the main unit 2 is placed in a half-pressed state, and notifies the state thereof to the CPU 70 of the I/O controller 61, and the full-press switch 87 is turned on in the event that the shutter button 7 is placed in a full-pressed state, and notifies the state thereof to the CPU 70 of the I/O controller 61.

That is, in the state of the capturing software 60A of the hard disk drive 60 being activated, the CPU 70 of the I/O controller 61 enters a still-image mode in the event that the shutter button 7 is placed in the half-pressed state by the user, controls the CCD camera 23 and executes freezing of still images, and in the event that the shutter button is placed in the full-pressed state, the frozen still image data is read in, and output to the data processing unit 85.

On the other hand, in the event that the CPU 70 of the I/O controller 61 enters the motion picture mode without activating the capturing software 60A, motion pictures up to around 60 seconds maximum is read in, and output to the data processing unit 85.

The I/O controller 61 is arranged so as to control the graphics processing circuit 55 connected to the PCI bus 51, and the image data made up of still images or motion images read in by the CCD camera 23 is subjected to predetermined data processing by the data processing unit 85 and input to the graphics processing circuit 55.

The graphics processing circuit 55 stores the supplied image data to the built-in VRAM (video Random Access Memory) 55A and reads out appropriately, following which this is sent to the LCD controller 65, and stored on the hard disk drive 60 as necessary.

The LCD controller 65 controls the backlight 84 of the display unit 3, so as to illuminate from the rear side of the liquid crystal display 21, and outputs the image data supplied from the graphics processing circuit 55 to the liquid crystal display 21, thereby displaying the data.

On the other hand, in the event that the CPU 52 has activated the digital map software 60B read out from the hard disk drive 60 onto the RAM 54, the map data according to the digital map software 60B is sent to the graphics processing circuit 55.

At this time, the graphics processing circuit 55 generates map image data to be displayed on the liquid crystal display 21 based on the supplied map data, stores this in the VRAM 55A, and reads out appropriately and sends this to the LCD controller 65.

Thus, the LCD controller 65 can display map images on the liquid crystal display 21 of the display unit 3, based on the map image data supplied from the graphics processing circuit 55.

Also, at the time of adding option functions, the PC card slot 53 connected to the PCI bus 51 receives mounting of a PC card (not shown) in an appropriate manner, so data can be exchanged with the CPU 52 via the PC card. For example, in the event that a PCMCIA GPS (Global Positioning System) card 57 is mounted to the PC card slot 53, airwaves from a GPS satellite are received with the GPS antenna 58 connected to the GPS card 57, thereby obtaining data of the current position.

Thus, the GPS card 57 sends data of the current position (latitude, longitude, and elevation), received via the GPS antenna 58, to the CPU 52 via the PCI bus 51.

In this case, the CPU 52 sends the current position data to the graphics processing circuit 55 and generates an arrow icon indicating the current position based on current position data by the graphics processing circuit 55, and then displays the arrow icon on the map image on the liquid crystal display 21 in a superimposed manner, via the LCD controller 65.

Hence, the liquid crystal display 21 is arranged so as to be able to make display, based on the position data detected by the GPS card 57, by the arrow icon moving on the map image.

Figure 9:
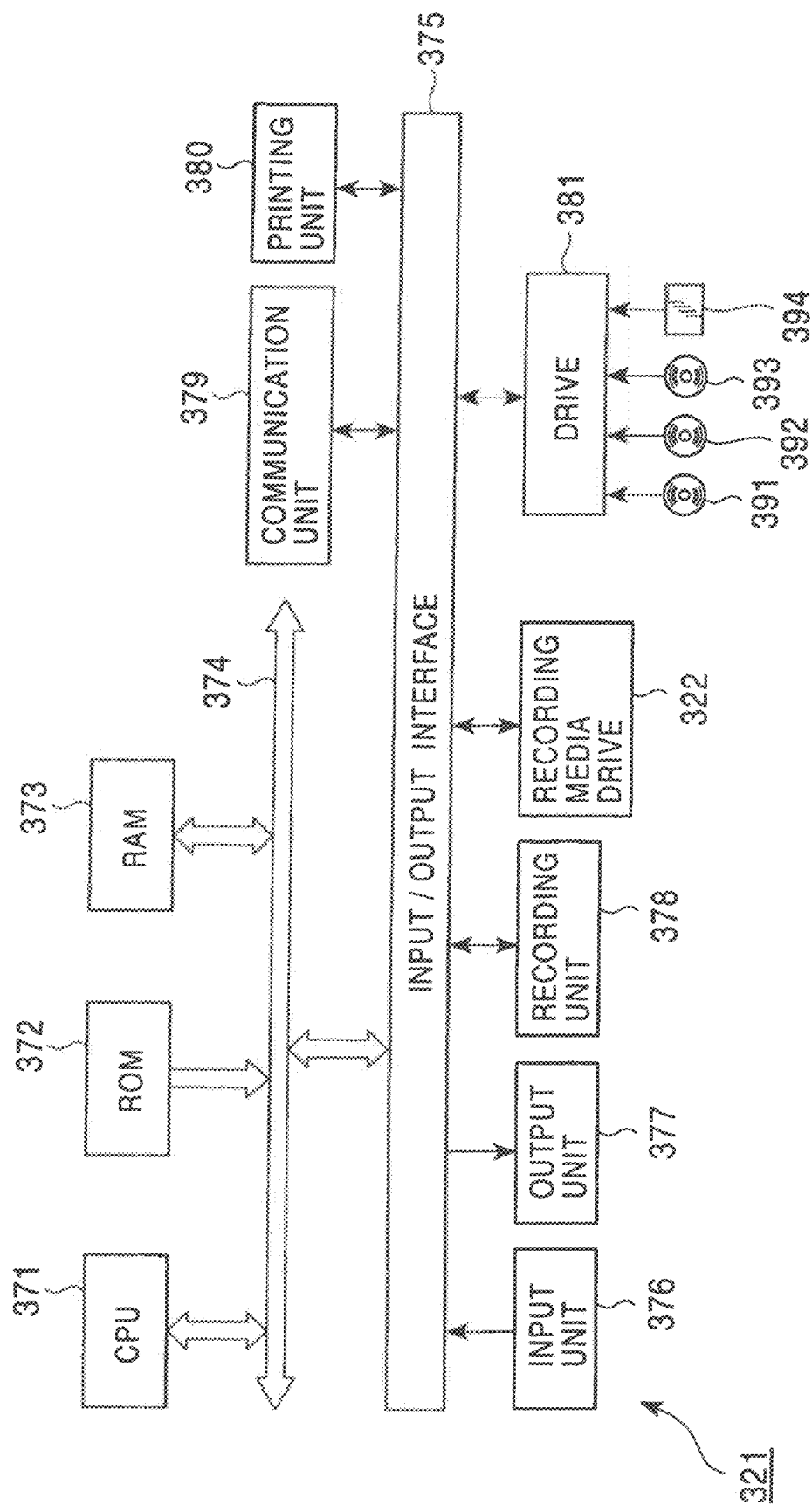
FIG. 9 is a block diagram illustrating a configuration example of the interior of the Web server shown in FIG. 1.

FIG. 9 illustrates a configuration example of the Web server 321. The CPU 371 executes various types of processing, according to programs read out from the ROM 372 or storing unit 378, and stored in the RAM 373. Data necessary for the CPU 371 to execute various processing, or programs, is appropriately stored in the RAM 373. The CPU 371, ROM 372, and RAM 373 are mutually connected via the bus 374, and also are connected to an input/output interface 375. Connected to the input/output interface 375 are an input unit 376 made up of a keyboard, mouse, etc., an output unit 377 made up of a speaker, CRT, LCD, etc., and a storing unit 378 made up of a hard disk or the like. Also, the input/output interface 375 is connected to a communication unit 379, so as to carry out communication with the Internet 311.

Further connected to the input/output interface 375 is a recording media drive 322, this recording media drive 322 arranged so as to record music data to the recording media such as a mounted CD-R, mini-disk, memory stick, and so forth. The printing unit 380 performs printing of a label (jacket). The drive 381 is mounted with a magnetic disk 391, optical disk 392, magneto-optical disk 393, semiconductor memory 394, and so forth, and the programs written thereto are loaded to the recording unit 378 or the RAM 373.

Figure 10:
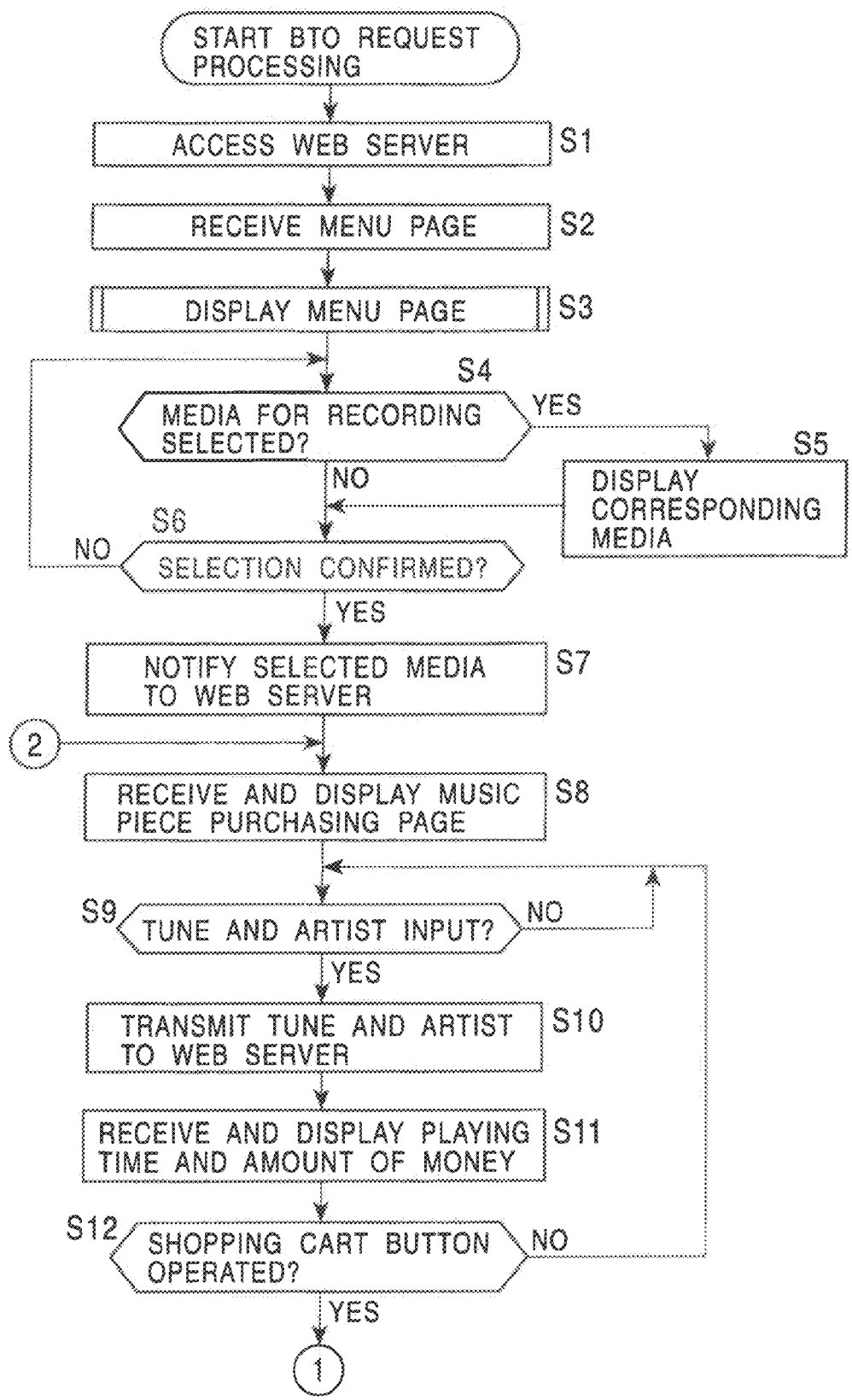
FIG. 10 is a flowchart describing the BTO request processing of the client shown in FIG. 1.
Figure 11:
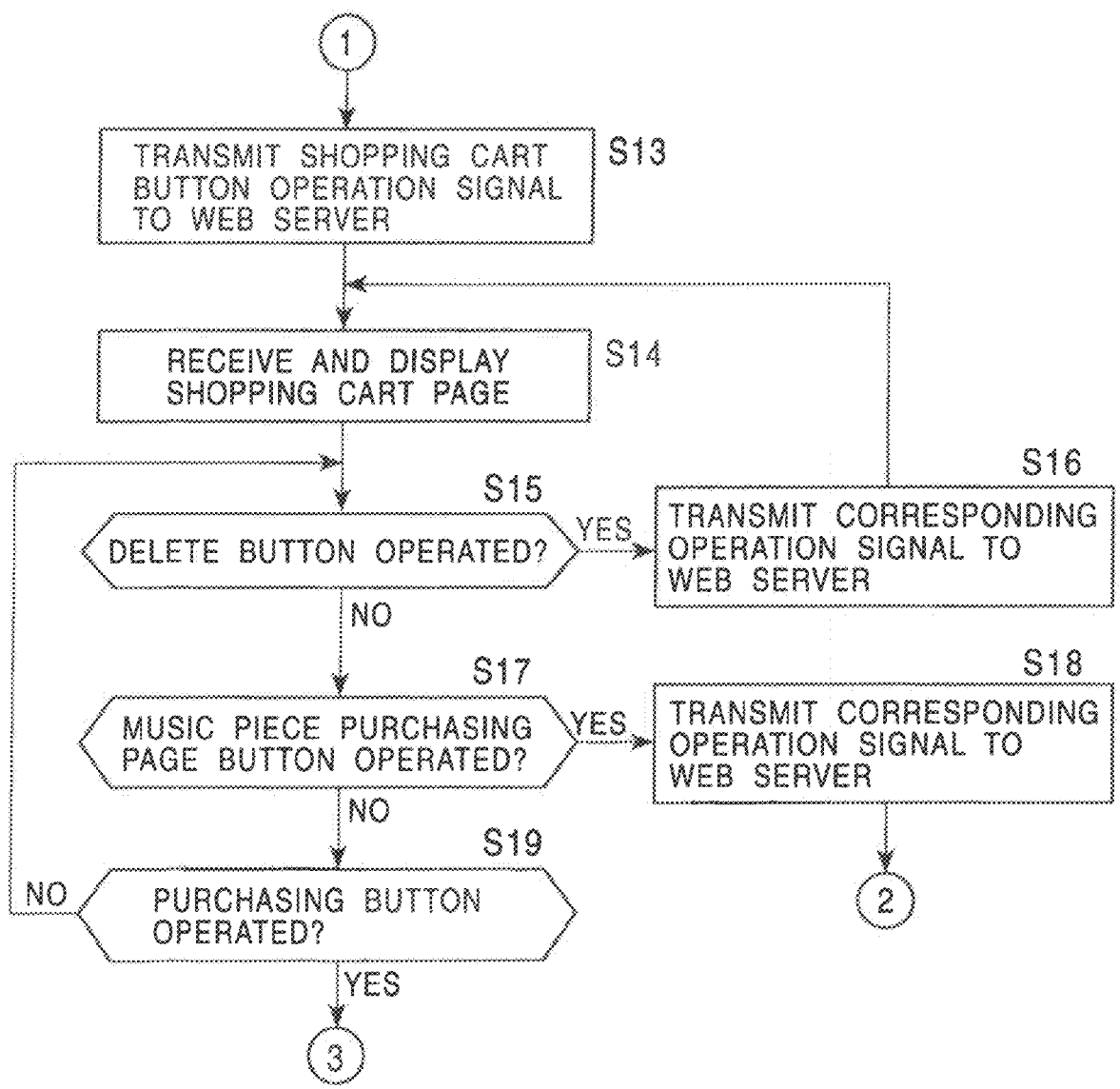
FIG. 11 is another flowchart describing the BTO request processing of the client shown in FIG. 1.
Figure 12:
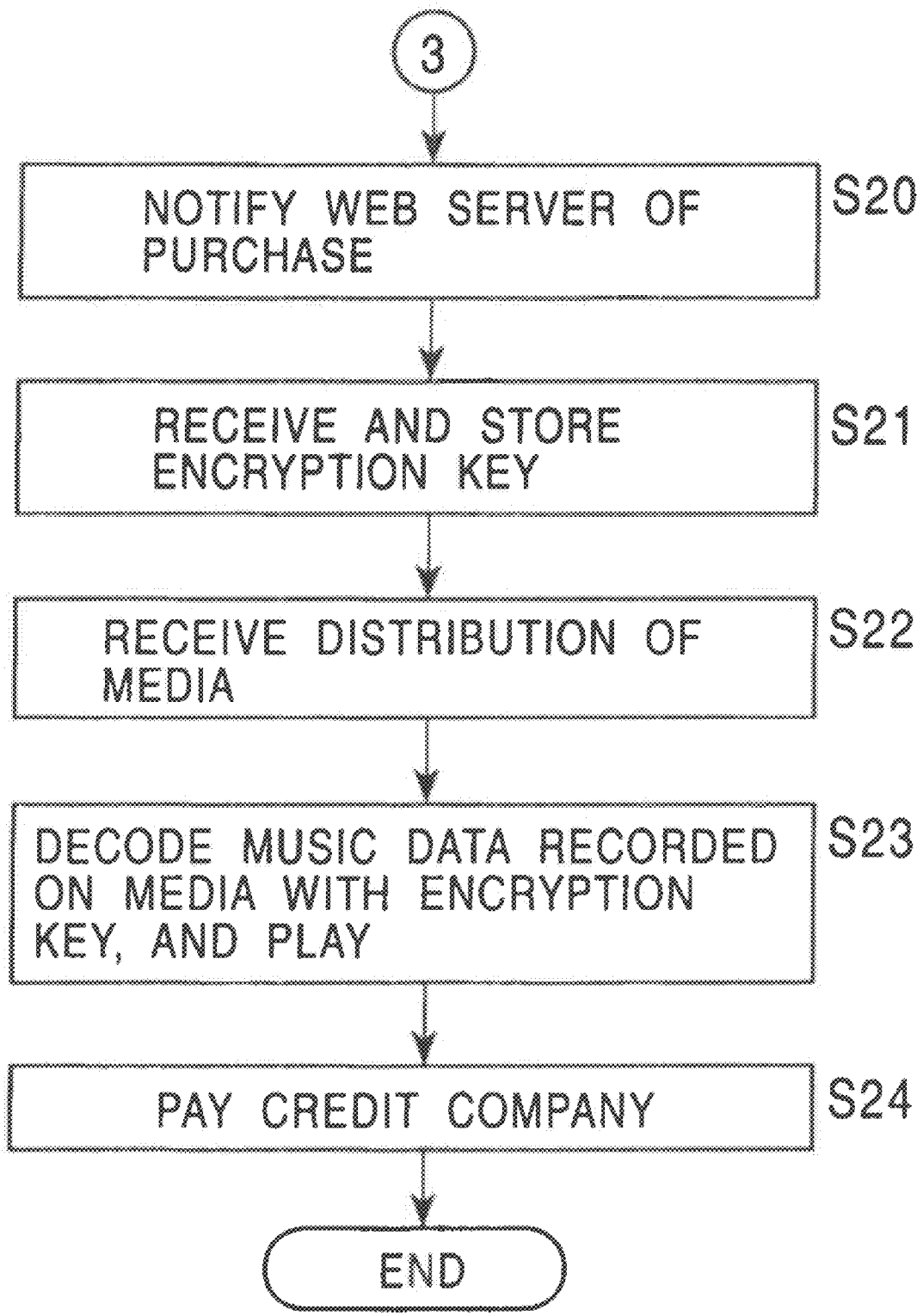
FIG. 12 is another flowchart describing the BTO request processing of the client shown in FIG. 1.
Figure 13:
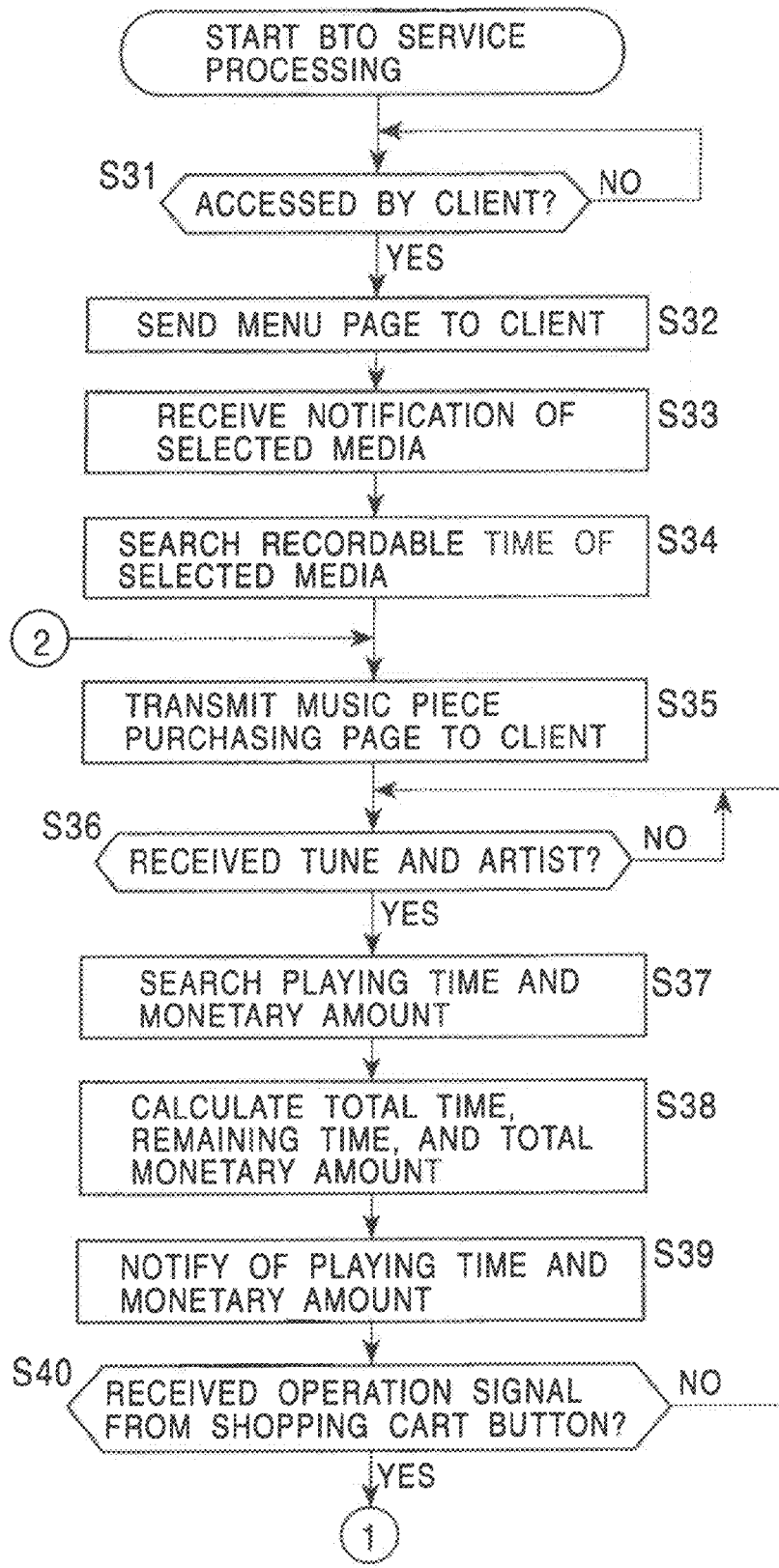
FIG. 13 is a flowchart describing the BTO service processing of the Web server shown in FIG. 1.
Figure 14:
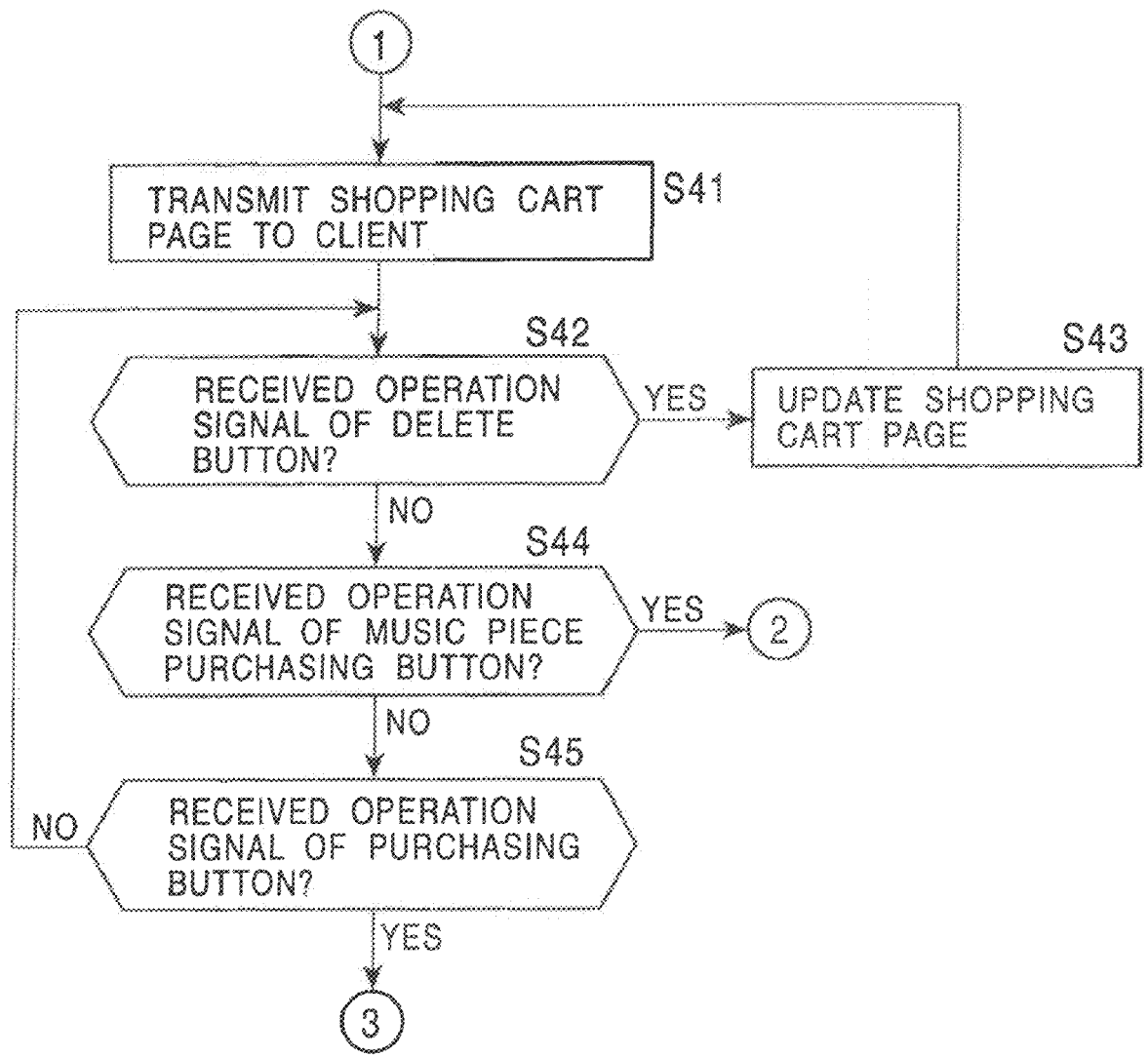
FIG. 14 is another flowchart describing the BTO service processing of the Web server shown in FIG. 1.
Figure 15:
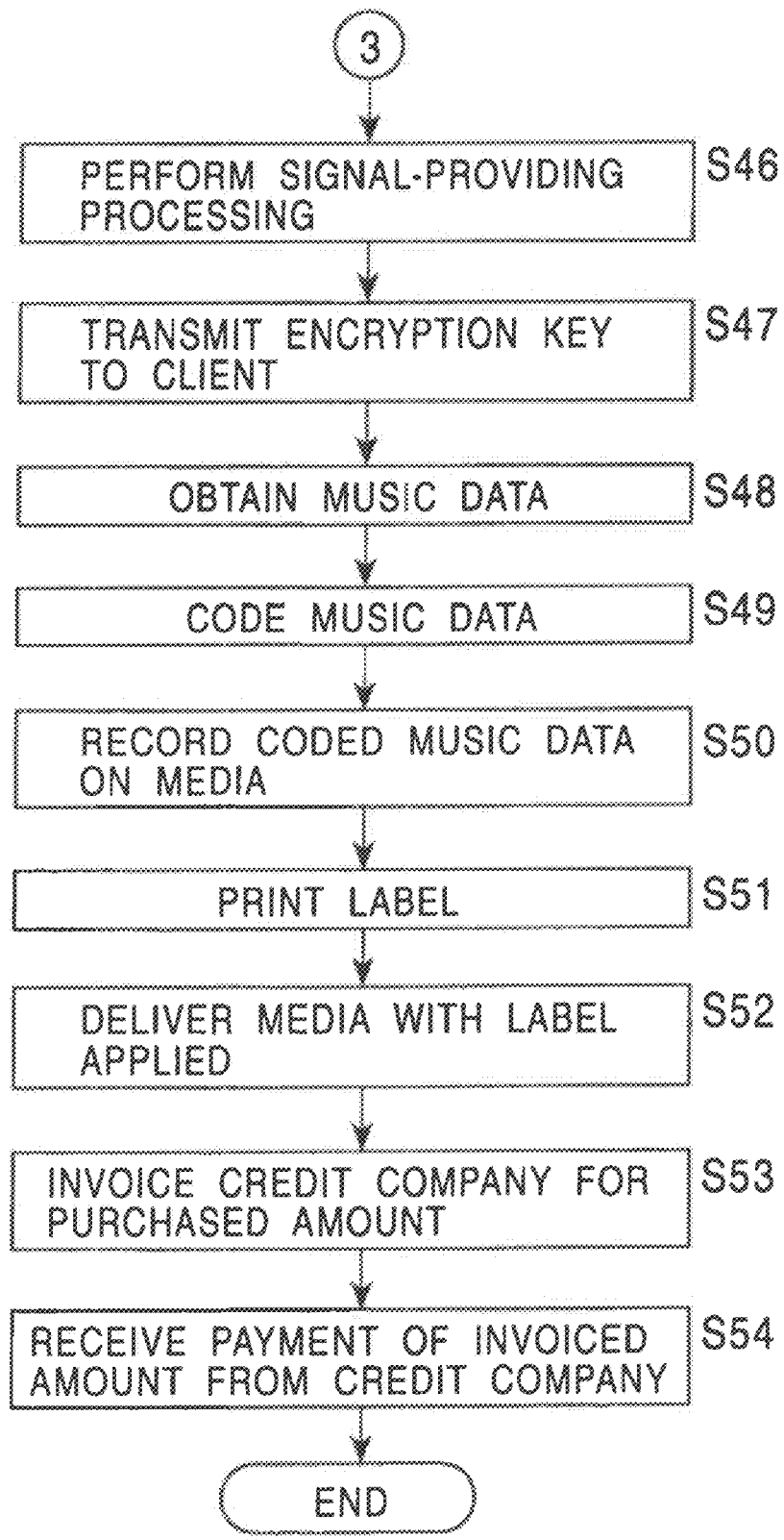
FIG. 15 is another flowchart describing the BTO service processing of the Web server shown in FIG. 1.

Next, the BTO (Built-to Order) service processing executed by this network system will be described with reference to FIGS. 10 through 16. The flowcharts in FIGS. 10 through 12 represent the action of the client 301. The flowcharts in FIGS. 13 through 15 represent the action of the Web server 321. The processing of the client 301 and the Web server 321 are mutually related, so in the following description, these flowcharts will be cross-examined as necessary, to describe the operation thereof.

Upon instructing access to the Web server 321 by the user operating the keyboard 4 or the stick-type pointing device, the CPU 52 of the client 301 executes the processing for accessing the Web server 321 in step S1, in correspondence to this instruction. That is, at this time, the CPU 52 controls the modem 66, and accesses the Web server 321 of the provider 101 via the Internet 311, from the telephone line 90. Of course, it is needless to say that the Web server 321 may be a server other than that of the provider 101.

The CPU 371 of the Web server 321 stands by in step S31 until access is received from the client 301 via the Internet 311 and the communication unit 379, in the event that access is received the flow proceeds to step S32, and executes processing of transmitting a menu page to the client 301. That is to say, the CPU 371 reads out menu page data stored in the storing unit 378 beforehand, and transmits this to the client 301 from the communication unit 379 via the Internet 311.

In step S2, the CPU 52 of the client 301 receives the data of the menu page transmitted from the Web server 321. Then, in step S3, the CPU 52 executes processing for displaying the menu page. That is, the CPU 52 supplies the menu page data received from the Web server 321 via the modem 66 to the liquid crystal display 21 via the LCD controller 65, and displays it. For example, a menu page 401 such as shown in FIG. 16 is displayed on the liquid crystal display 21.

Figure 16:
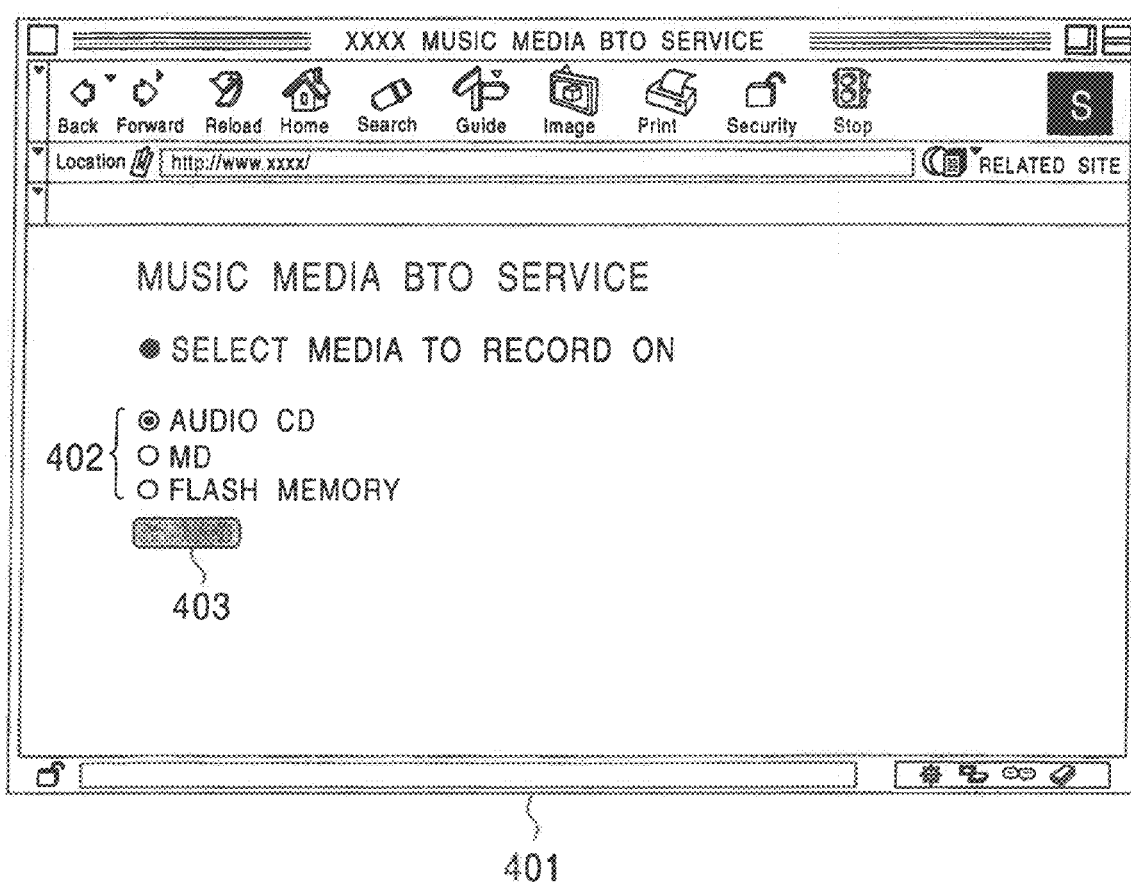
FIG. 16 is a diagram illustrating a display example of the menu page of the client shown in FIG. 1.

In the menu page 401 shown in FIG. 16, a button 402 for selecting one of the three types of recording media, i.e., Audio CD, MD, and flash memory, and a button 403 operated to confirm the selection, are displayed. Now, flash memory as used here refers to semiconductor memory such as removable memory cards used for stereo headphones, primarily Memory Stick Walkman (registered trademark).

Now, the CPU 52 judges in step S4 whether or not the media onto which to record has been selected, and in the event that judgement is made that selection has been made, the flow proceeds to step S5, and executes processing for displaying the corresponding media. For example, in the event that the user operates the stick-type pointing device 5 and operates the button corresponding to MD from the buttons 402, signals corresponding to that operation are input from the pointing device controller 63 to the CPU 52. At this time, the CPU 52 changes display so as to indicate that of the buttons 402, that corresponding to MD has been selected.

In step S4, in the event that judgement is made that no media to record to has been selected, the processing for displaying the corresponding media is ended in step S5, following which the flow proceeds to step S6, and the CPU 52 judges whether or not the selection has been confirmed, i.e., whether or not the button 403 has been operated. In the event that the button 403 has not been operated, the flow returns to step S4, and subsequent processing is repeatedly executed.

The user selects one of the media of the three types available by operating one of the buttons 402, and then operates the button 403. In the event that the button 403 is operated, the CPU 52 proceeds to step S7, and processing for notifying the Web server 321 of the selected media is executed. For example, as shown in FIG. 16, in the state that Audio CD has been selected, operating the button 403 causes the CPU 52 to notify the Web server 321 of the fact that the Audio CD has been selected, via the modem 66.

In the event that the CPU 371 of the Web server 321 receives notification of the media transmitted by the client 301 via the communication unit 379 in step S33, processing is executed in step S34 to search for the recordable time of the selected (received) media. That is to say, the CPU 371 accesses the recording media recordable time information database 323 from the communication unit 379, and searches the recordable time of the selected media. In this case, the Audio CD is selected, so the recording time is searched as 74 minutes, as shown in FIG. 2A.

In step S35, the CPU 371 reads out music piece purchasing page data from the storing unit 378, and transmits this from the communication unit 379 to the client 301.

Figure 17:
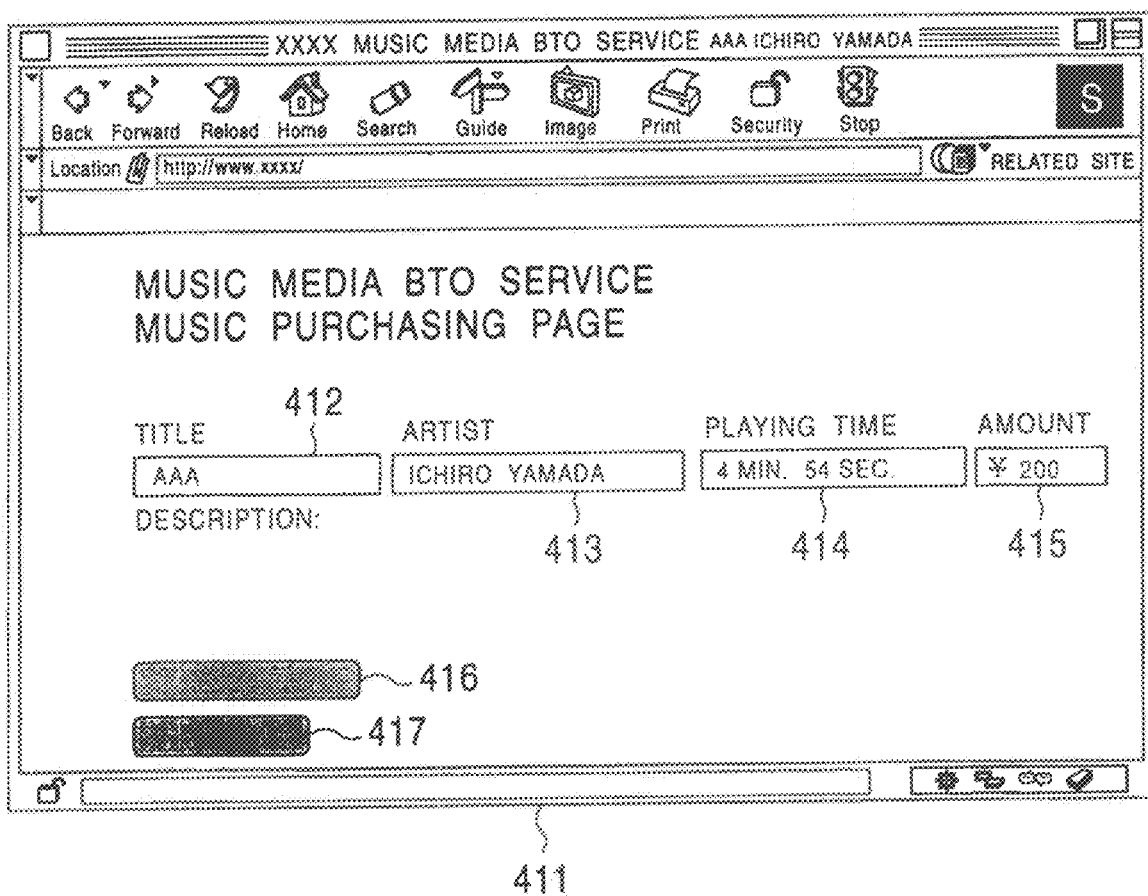
FIG. 17 is a diagram illustrating a display example of the music piece purchasing page of the client shown in FIG. 1.

The CPU 52 of the client 301, upon receiving the music piece purchasing page data in step S8, supplies this to the liquid crystal display 21 via the LCD controller 65, and performs display thereupon. Thus, the image of a music piece purchasing page 411 such as shown in FIG. 17 is displayed on the liquid crystal display 21. However, in this case, the title input space 412, artist input space 413, playing time display space 414, and monetary amount display space 415, are all blank.

The user looks at the display of this music piece purchasing page 411, operates the keyboard 4 so as to input the title of the piece to purchase to the input space 412 and input the artist in the input space 413, and following completion of input, and operates the button 416 displaying "Place in shopping cart" in the event that the input is correct.

In step S9, the CPU 52 stands by until judgement is made that the title and artist have been input (i.e., button 416 has been operated), and in the event that judgement is made that this input has been performed, the flow proceeds to step S10, and the input title and artist are transmitted to the web server 321. In the example shown in FIG. 17, "AAA" has been input as the title to the input space 412, and "ICHIRO YAMADA" has been input as the artist to the input space 413. This information is transmitted to the Web server 321.

In step S36, the CPU 371 of the Web server 321 stands by until judgement has been made that the title and artist have been received from the client 301, and in the event that judgement is made that this has been received, the flow proceeds to step S37, where the playing time and the monetary amount for the music specified by the title and artist are searched. That is, at this time, the CPU 371 accesses the playing time information database 324 and the monetary information database 325, thereby searching the playing time and the monetary amount corresponding to the title and artist received in step S36 via the communication unit 379.

In step S38, the CPU 371 adds the playing time searched in step S37 to the total playing time searched up to that time, and computes a new total time. Also, the remaining recordable time is computed by subtracting the total time from the recordable time searched in step S34. The CPU 371 also adds the monetary amount searched in step S37 to the total monetary amount up to that point, and updates the total monetary amount. In step S39, the CPU 371 notifies the client 301 of the playing time and monetary amount searched in step S37.

In step S11, the CPU 52 receives the playing time and the monetary amount transmitted from the Web server 321, and displays each in the respective spaces, i.e., the display space 414 for playing time and the display space 415 for monetary amount, as shown in FIG. 17. Thus, the user can know the playing time and the monetary amount of the music piece input to the input spaces 412 and 413.

Next, in step S12, the CPU 52 judges whether or not the shopping cart button 417 has been operated, and in the event that it has not been operated, the flow returns to step S9, and subsequent processing is executed repeatedly. Thus, the user sequentially specifies the music pieces that he/she wants to purchase, based on the GUI of the music piece purchasing page 411 shown in FIG. 17, and sequentially operates the "Place in shopping cart" button 416.

Then, after specifying an arbitrary number of music pieces, the user operates the shopping cart button 417. At this time, in step S13, the CPU 52 transmits operating signals of the shopping cart button 417 to the Web server 321.

In step S40, the CPU 371 of the Web server 321 stands by until receiving the operating signals of the shopping cart button 417, and in the event the signal is not received, the flow returns to step S36, and subsequent processing is executed repeatedly. Thus, the playing time and monetary amount for the music pieces selected by the user by input to the music piece purchasing page 411 are sequentially supplied from the Web server 321 to the client 301.

In step S40, in the event that judgement is made that operating signals for the shopping cart button 417 have been received, the CPU 371 proceeds to step S41, reads the shopping cart page data from the storing unit 378, and transmits this to the client 301.

In step S14, upon the CPU 52 of the client 301 receiving the shopping cart page data transmitted from the Web server 321, the data is supplied to the liquid crystal display 21, and displayed. Thus, the image of a shopping cart page 421 such as shown in FIG. 18 is displayed on the liquid crystal display 21.

Figure 18:
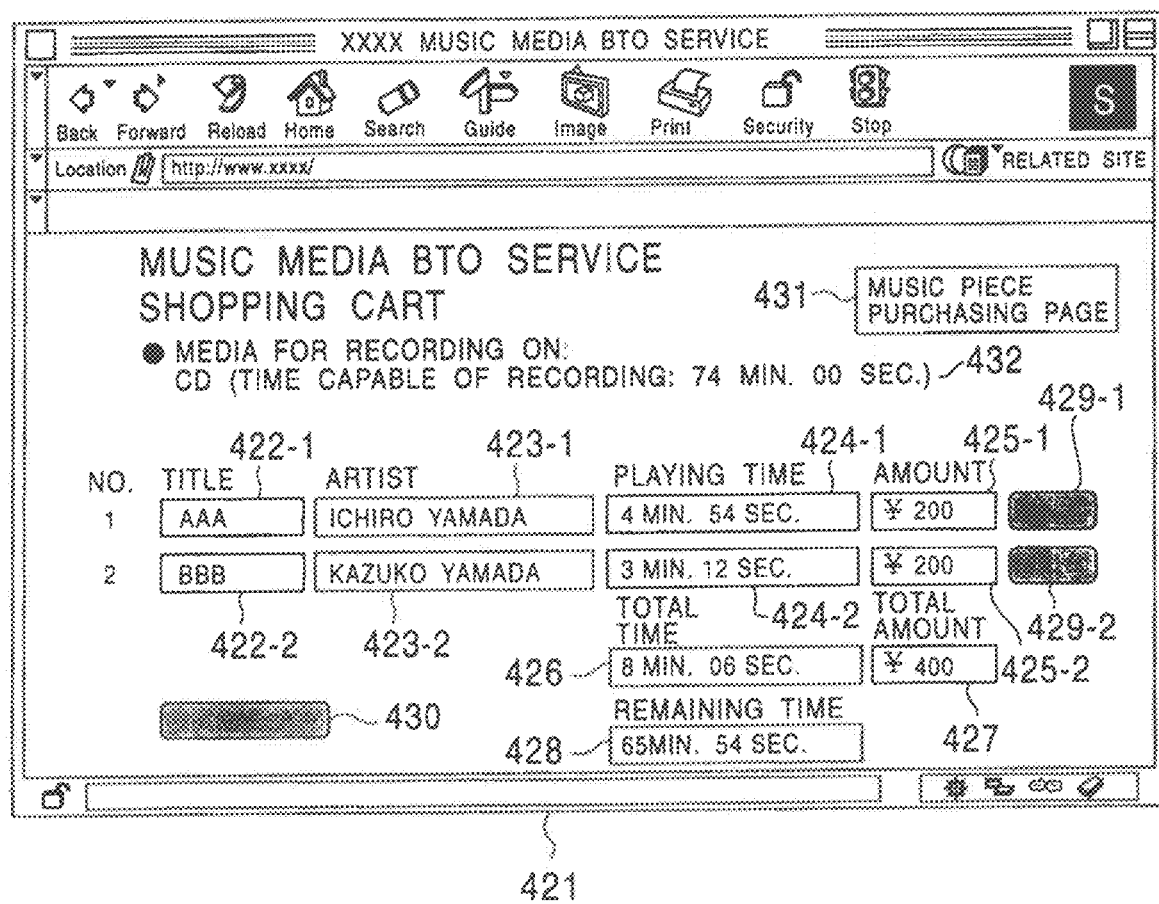
FIG. 18 is a diagram illustrating a display example of the shopping cart page of the client shown in FIG. 1.

As shown in FIG. 18, with the shopping cart page 421, the title and artist specified by the user with the piece purchasing page 411, and the correlating playing time and monetary amount are respectively displayed in the display spaces 422-1 through 425-2. Also, the total time of the playing time is displayed in the display spaces 424-1 and 424-2 are displayed in the display space 426, and the total monetary amount is displayed in the display spaces 425-1 and 425-2 are displayed in the display space 427. Further, the remaining recordable time for this recording media is displayed in the display space 428. Displayed in this remaining time display space 428 is the time obtained by subtracting the total time displayed in the display space 426 (in this case, 8 minutes 06 seconds) from the time capable of recording on the media (in this case, 74 minutes 00 seconds), i.e., 65 minutes 54 seconds in this case. This total time, remaining time, and total monetary sum, are obtained by the computations of step S38.

The shopping cart page 421 further displays a button 430 which is operated in the event that the music piece displayed is purchased, and a button 431 which is operated at the time of returning to the music piece purchasing page. Also, buttons 429-1 and 429-2 are displayed to be operated in cases wherein pieces are to be deleted individually.

In step S15, the CPU 52 judges whether or not the delete buttons 429-1 and 429-2 have been operated, and in the event that judgement is made that at least one of these has been operated, the flow proceeds to step S16 and updating processing of the shopping cart 421 is executed. Subsequently, the processing returns to step S14.

In step S42, the Web server 321 judges whether or not operating signals of the delete buttons 429-1 and 429-2 have been received, and in the event that judgement is made that the signals have been received, the flow proceeds to step S43, and executes updating processing of the shopping cart page 421. That is, with reference to FIG. 18, in the event that the delete button 429-2 corresponding to the No. 2 music piece is operated, the information of the music piece denoted by No. 2 is deleted, and the total time, total monetary amount, and remaining time are re-calculated. Subsequently, the flow returns to step S41, and the CPU 371 transmits the data of the updated shopping cart page to the client 301.

Figure 19:
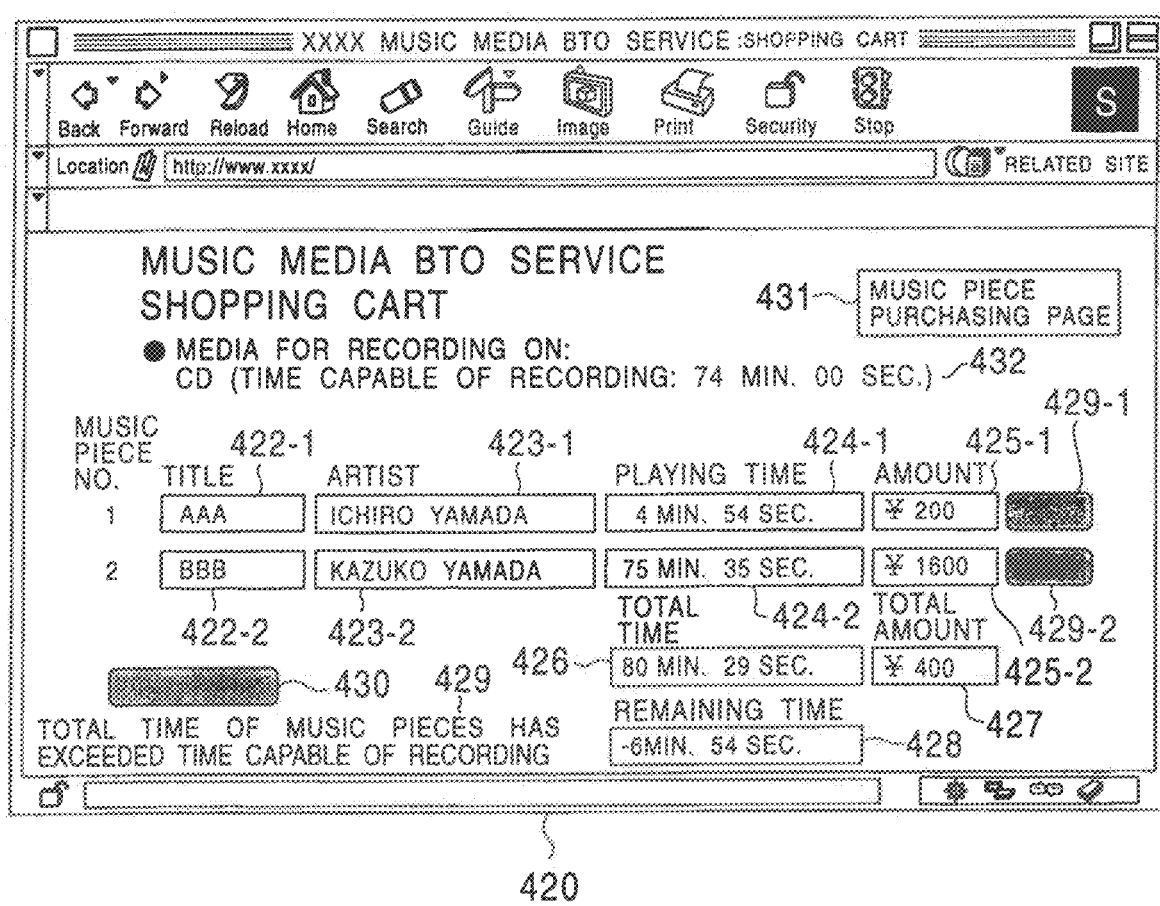
FIG. 19 is a diagram illustrating a different display example of the shopping cart page of the client shown in FIG. 1.

That is to say, in the event of computing the total time, the CPU 371 of the Web server 321 judges whether or not the total time is greater than the recordable time computed in step S38, and in the event that judgement is made that this is greater, a warning message such as "the total time of music pieces has exceeded the recordable time", which is inserted into the shopping cart page, and transmitted to the client 301. Thus, a warning 427 such as shown in FIG. 19 is displayed on the liquid crystal display 21 of the client 301. In the event that such a warning is displayed, the user can use the delete button 429-2 for example, to adjust the total time to where it is equal to or shorter than the recordable time.

In step S14, upon receiving this updated shopping cart page data, the CPU 52 of the client 301 displays it on the liquid crystal display 21. Thus, the No. 2 information in FIG. 18 is deleted, and a shopping cart page 421 displaying the total time, total monetary sum, and remaining time, is displayed so as to correspond to the information No. 1.

In step S15, in the event that judgement is made that the delete buttons 429-1 and 429-2 have not been operated, the flow proceeds to step S17, the CPU 52 judges whether or not the piece purchasing page button 431 has been operated, and in the event judgement is made that this has been operated, the flow proceeds to step S18, and transmits corresponding operating signals to the Web server 321. Subsequently, the processing returns to step S8.

In step S42, in the event that the CPU 371 of the Web server 321 judges that operating signals of the delete buttons 429-1 and 429-2 have not been received, the flow proceeds to step S44, judgement is made regarding whether or not operating signals for the piece purchasing page button 431 have been received, and in the event judgement is made that the signals have been received, the flow returns to step S35, and executes the processing for transmitting the piece purchasing page data to the client 301 again.

In step S8, upon receiving the piece purchasing page data, the CPU 52 of the client 301 displays the data on the liquid crystal display 21. Thus, a piece purchasing page 411 such as shown in FIG. 17 is displayed again, and the user performs operations for specifying the pieces to purchase, based on this GUI.

In step S17, in the event that judgement is made that the piece purchasing page button 431 has not been operated, the flow proceeds to step S19, and the CPU 52 judges whether or not the purchasing button 430 has been operated. In the event that judgement is made that the purchasing button 430 has not been pressed, the flow returns to step S15, and the subsequent processing is repeatedly executed.

In step S19, in the event that judgement is made that the purchasing button 430 has been pressed, the flow proceeds to step S20, and the CPU 52 transmits signals corresponding to the operation thereof to the Web server 321. In other words, the purchase is notified to the Web server 321.

In step S44, in the event that judgement is made that operating signals of the piece purchasing page button 431 have not been received, the CPU 371 of the Web server 321 judges whether or not operating signals of the purchasing button 430 have been received, and in the event judgment is made that the signals have not been received, the flow returns to step S42, and subsequent processing is repeatedly executed.

In step S45, in the event that judgment is made that operating signals of the purchasing button 430 have been received, the CPU 371 proceeds to step S46, and performs signal-providing (credit authorization) processing.

That is, the CPU 371 of the Web server 321 accesses the credit company 441 (see FIG. 20, described later) via the communication unit 379, makes reference to the client 301 past purchasing history, and judges whether or not there has been unauthorized processing in the past such as unpaid and overdue bills. In the event that there has been no unauthorized processing in the past, the flow proceeds to step S47, the CPU 371 reads out the encryption key stored in the storing unit 378 and transmits this to the client 301, and in step S48, the CPU 371 accesses the music piece database 326 and obtains the music piece data of the music pieces displayed as a final selection in the shopping cart page 421.

Then, in step S49, the CPU 371 encrypts the obtained music data with the encryption key transmitted to the client 301 in step S47. Further, in step S50, the CPU 371 executes processing for recording the music data encoded in step S49 to the media notified in step S33. That is to say, at this time the CPU 371 controls the recording media drive 322 so as to record the encoded music data to the media specified by the user.

In step S51, the CPU 371 accesses the label information database 327 and searches label (jacket) information corresponding to music data recorded to the media, and causes the printing unit 380 to print a label (jacket) corresponding to the information.

Subsequently, the label printed in step S51 is applied to the media to which the data is stored in step S50, and the media is delivered to the user of the client 301 by post or courier.

In step S53, the CPU 371 executes processing for invoicing the credit company 441 (FIG. 20) for a monetary amount corresponding to the purchasing amount of the music data by the user. Then, in step S54, the CPU 371 receives payment of the invoice amount from the credit company.

On the other hand, in step S21, at the point that the CPU 52 of the client 301 receives the encryption key from the Web server 321 via the Internet 311, this is stored in the hard disk of the hard disk drive 60. Then, in step S22, upon receiving the delivery of the media from the administrator of the Web server 321, the user in step S23 mounts the delivered media (in this case, the CD-R) to a CD player 304. The CPU 52 access the CD player 304 via the 1394 serial bus 305 upon instruction from the user, and plays the encoded music data recorded on the CD-R mounted there. Once the played music data is taken in, this is decoded with the encryption key stored on the hard disk of the hard disk drive 60, and played. This played music data is output from the sound chip 64 to the speaker 6.

Further, in step S24, the user makes payment to the credit company 441 for an amount corresponding to the purchased music data.

Figure 20:
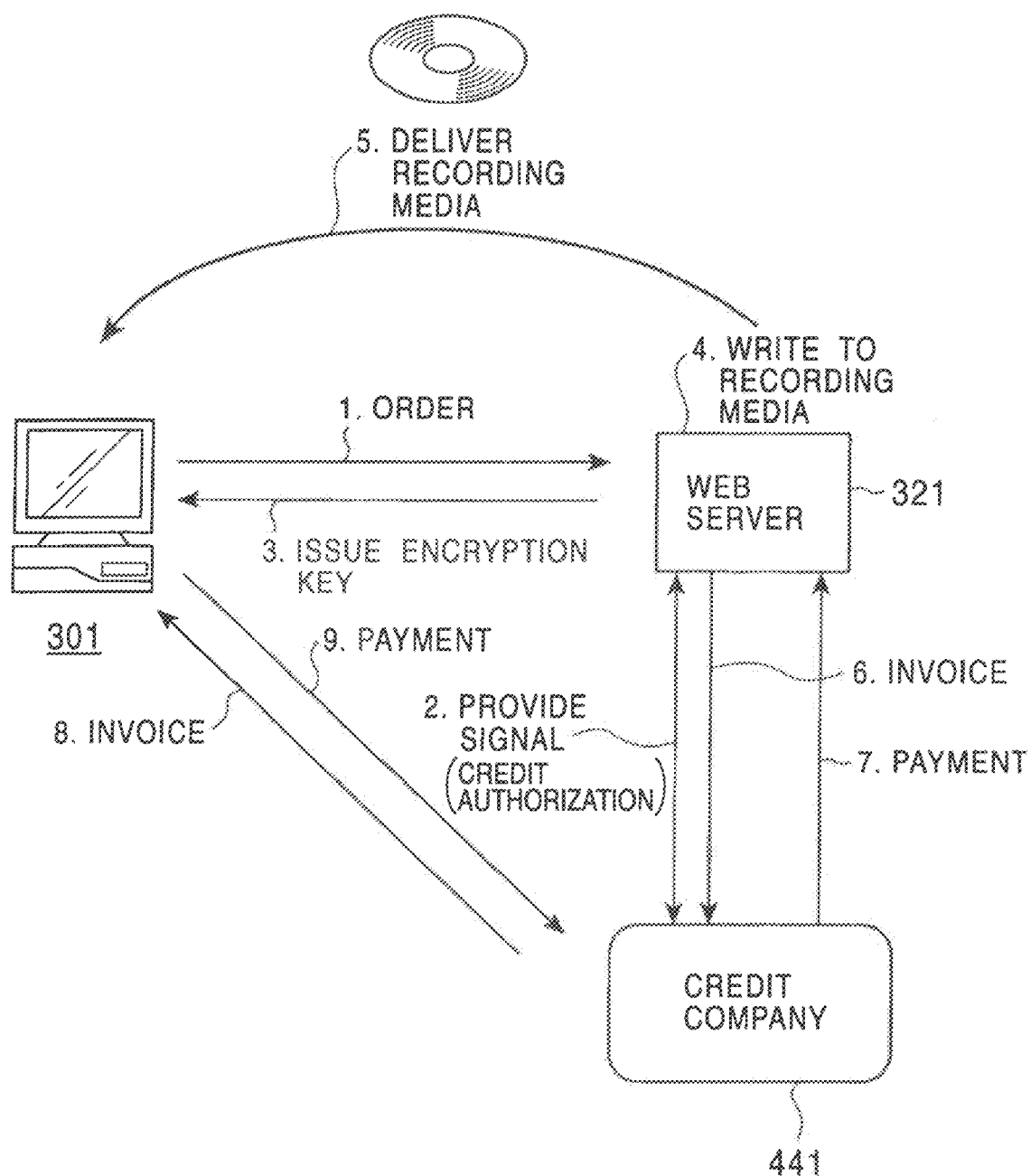
FIG. 20 is a diagram illustrating the procedures of the processes shown in FIGS. 10 through 15.

The above processing can be summarized as shown in FIG. 20. Note that in this Figure, the numerals mean the order in which processing is performed. First, the client 301 places an order with the Web server 321. The Web server 321 performs a signal-providing (credit authorization) process to the credit company 441, and if the ordering individual is not one who has conducted unauthorized processing, an encryption key is issued to the client 301. Then, the Web server 321 uses that encryption key to encode the music data for which the order has been received, and this is recorded on the specified recording media. The recording media is then delivered to the user of the client 301.

The Web server 321 invoices the credit company 441 for an amount corresponding to the monetary amount of the purchase made by the user of the client 301. The credit company 441 then pays this amount to the administrator of the Web server 321 instead of the user of the client 301. Subsequently, the credit company 441 invoices the user of the client 301 for the payment which it has made instead of the user, and the user of the client 301 pays the credit company 441 the amount corresponding to this invoice.

In the above description, the music data specified by the user is recorded to the media in the order specified at the Web server 321, and the media is delivered to the user of the client 301, but an arrangement may be made wherein the specified music data is transmitted to the client 301 via the Internet 311, and thus recorded. The processing for this arrangement is described in the flowcharts shown in FIGS. 21 through 26. The flowcharts shown in FIGS. 21 through 23 indicate the processing at the client 301 side, and the flowcharts shown in FIGS. 24 through 26 indicate the processing at the Web server 321 side.

Figure 21:
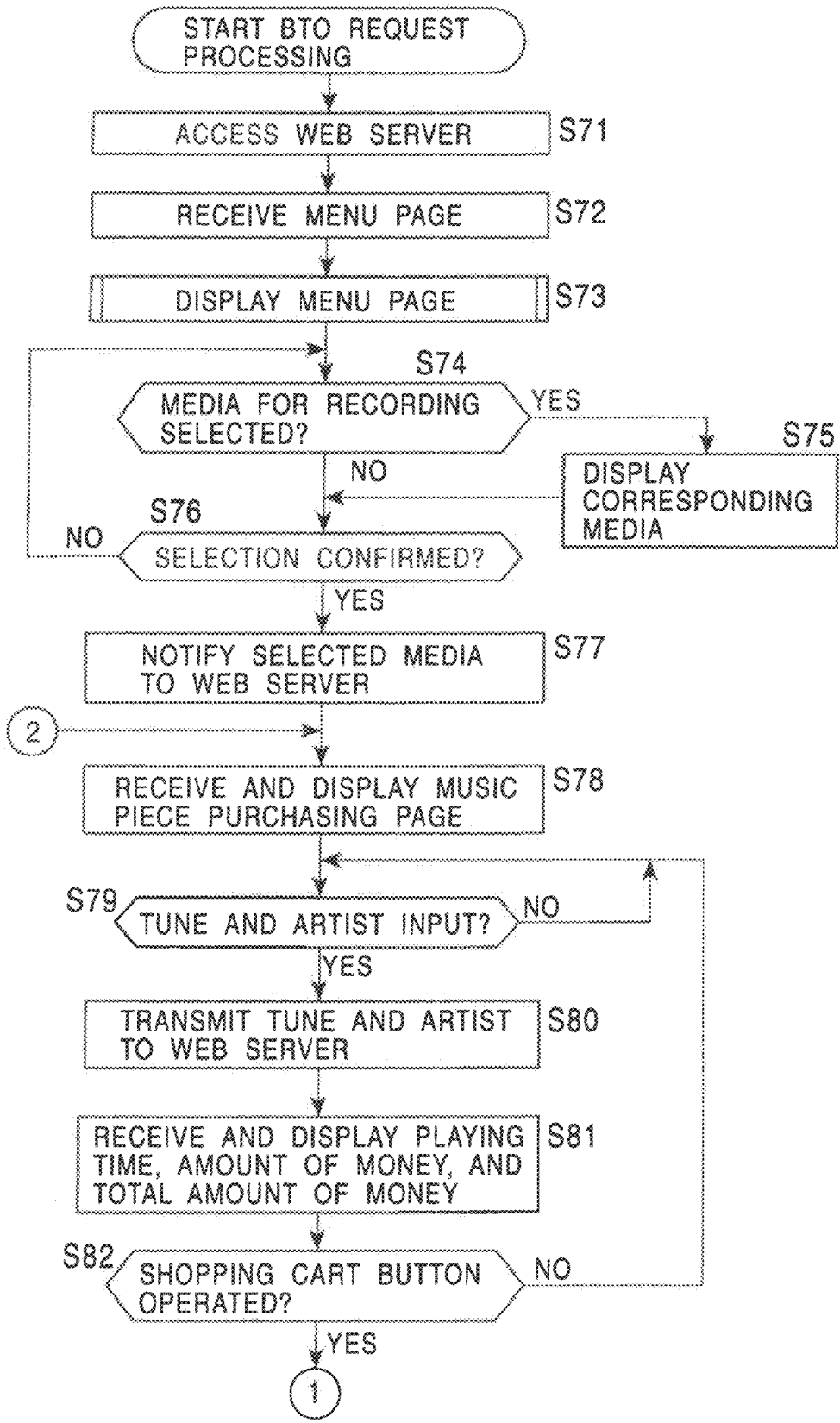
FIG. 21 is a flowchart describing the BTO request processing of the client shown in FIG. 1.
Figure 22:
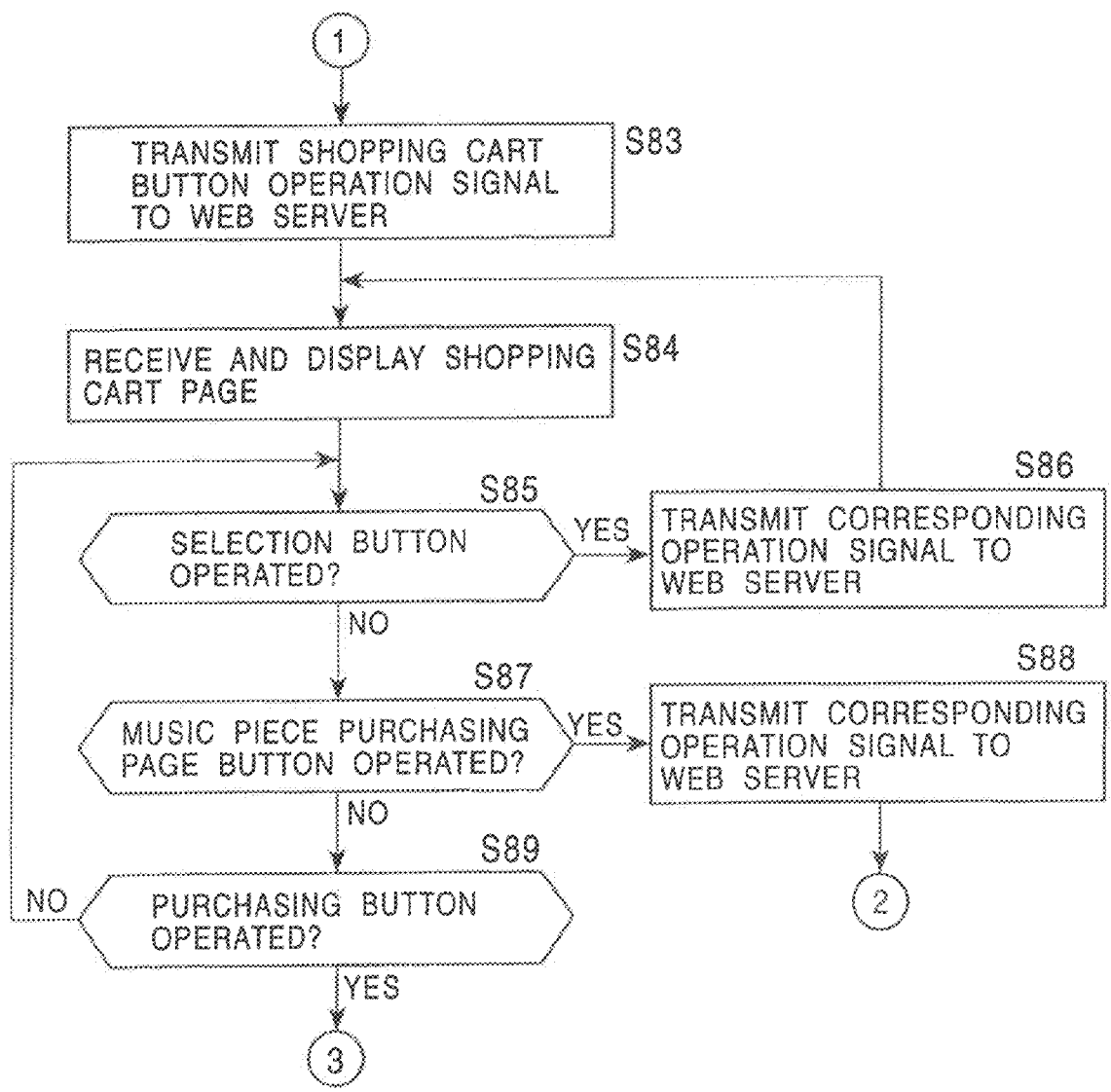
FIG. 22 is another flowchart describing the BTO request processing of the client shown in FIG. 1.
Figure 23:
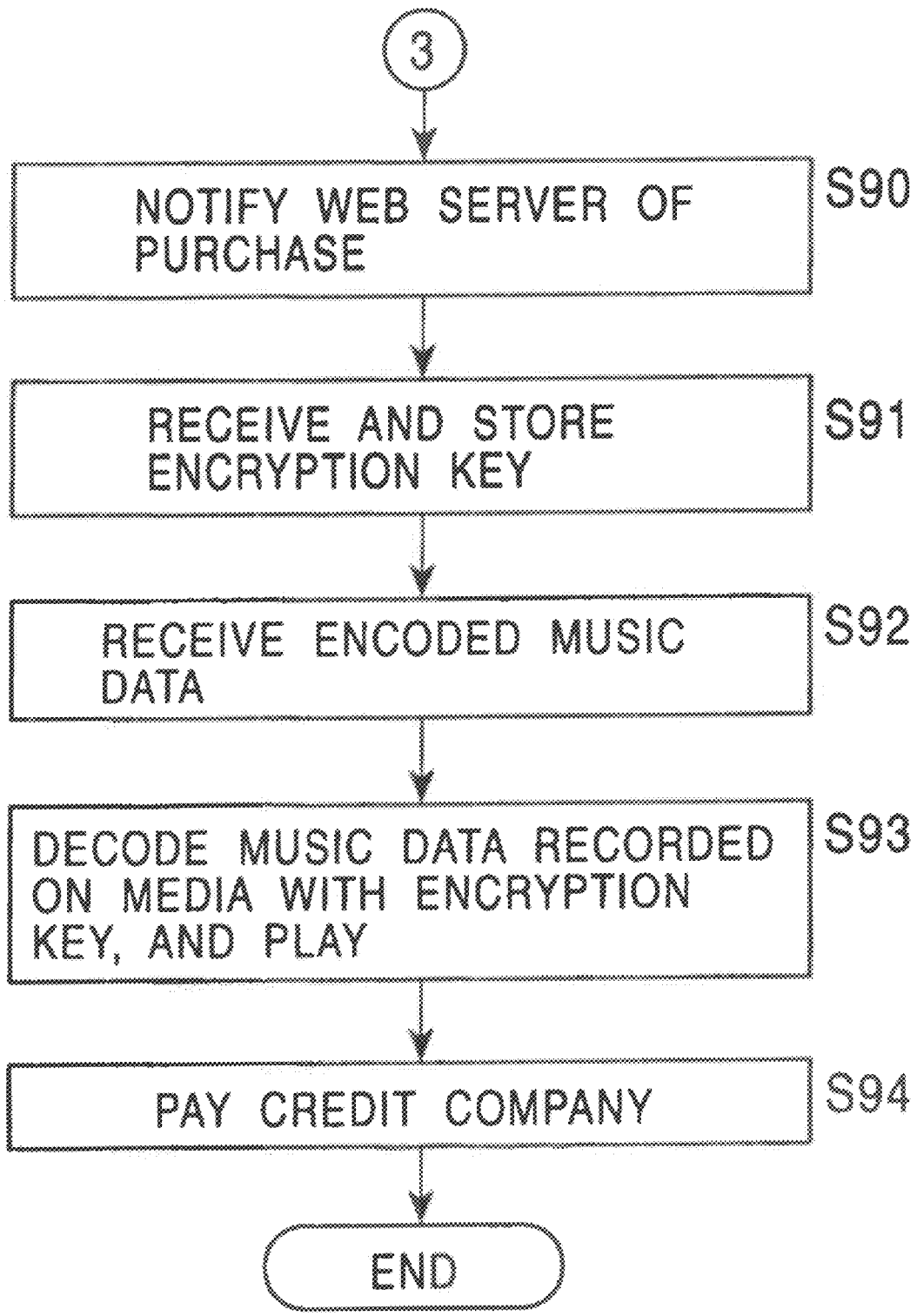
FIG. 23 is another flowchart describing the BTO request processing of the client shown in FIG. 1.
Figure 24:
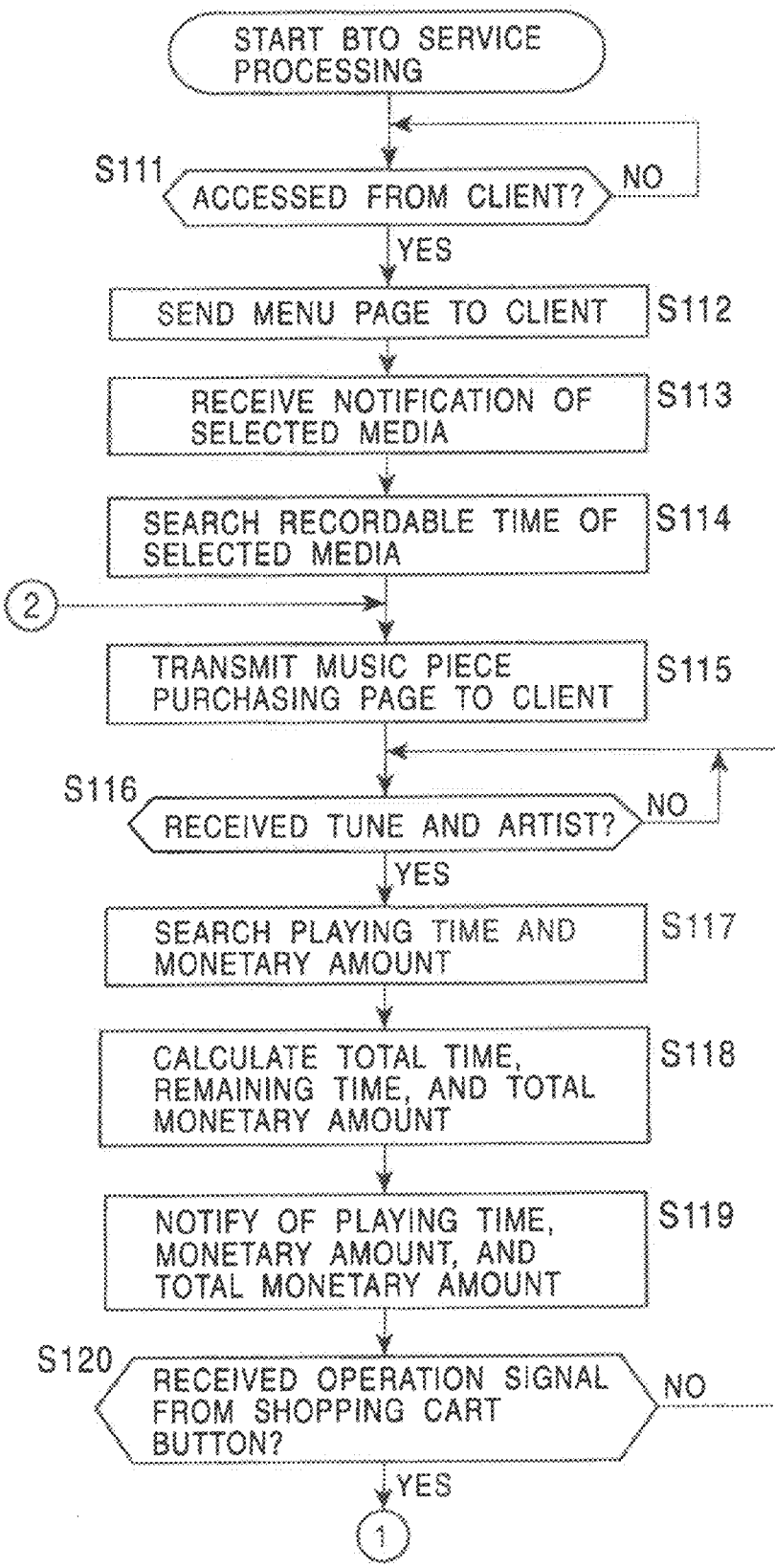
FIG. 24 is a flowchart describing the BTO service processing of the Web server shown in FIG. 1.
Figure 25:
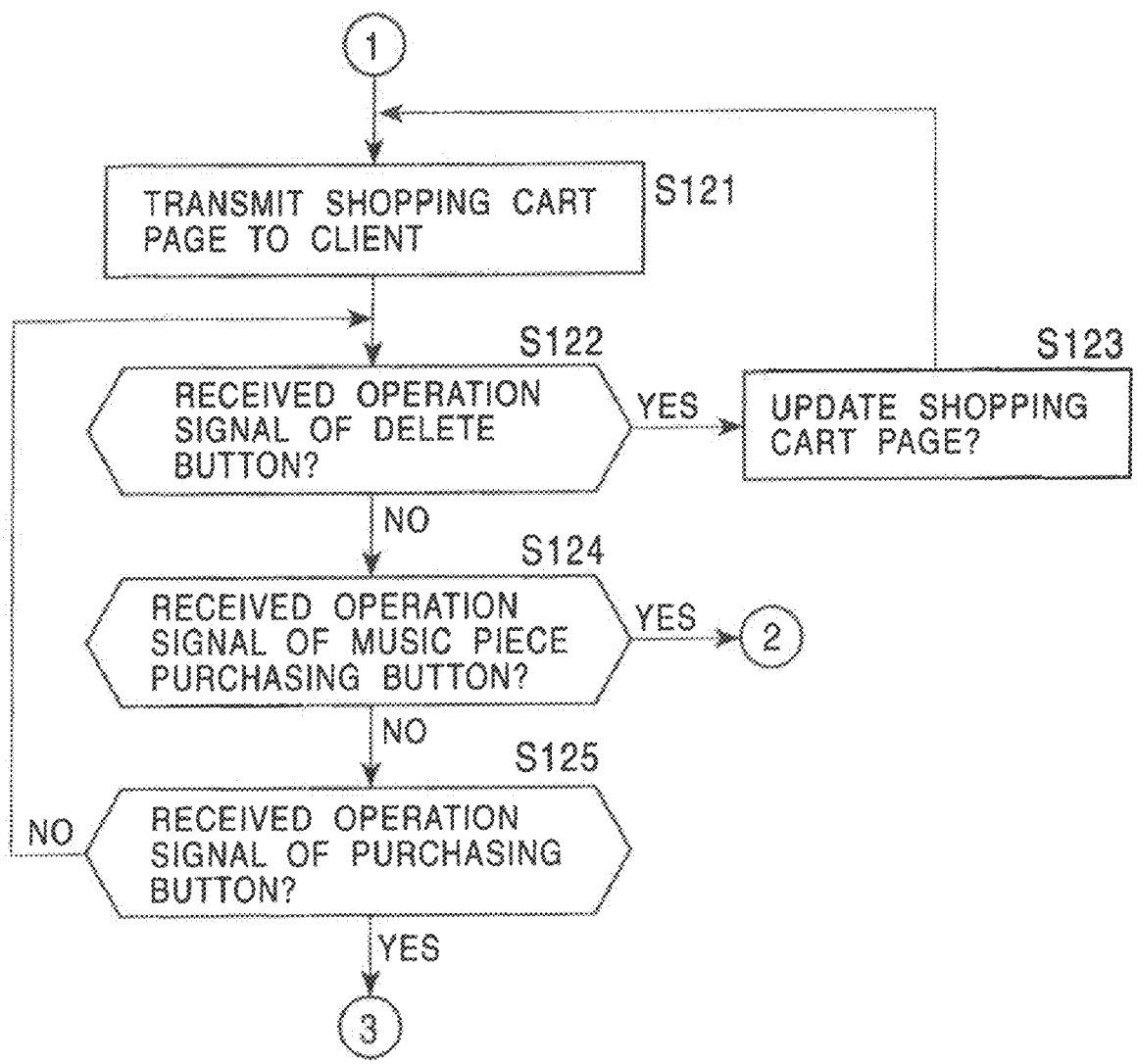
FIG. 25 is another flowchart describing the BTO service processing of the Web server shown in FIG. 1.
Figure 26:
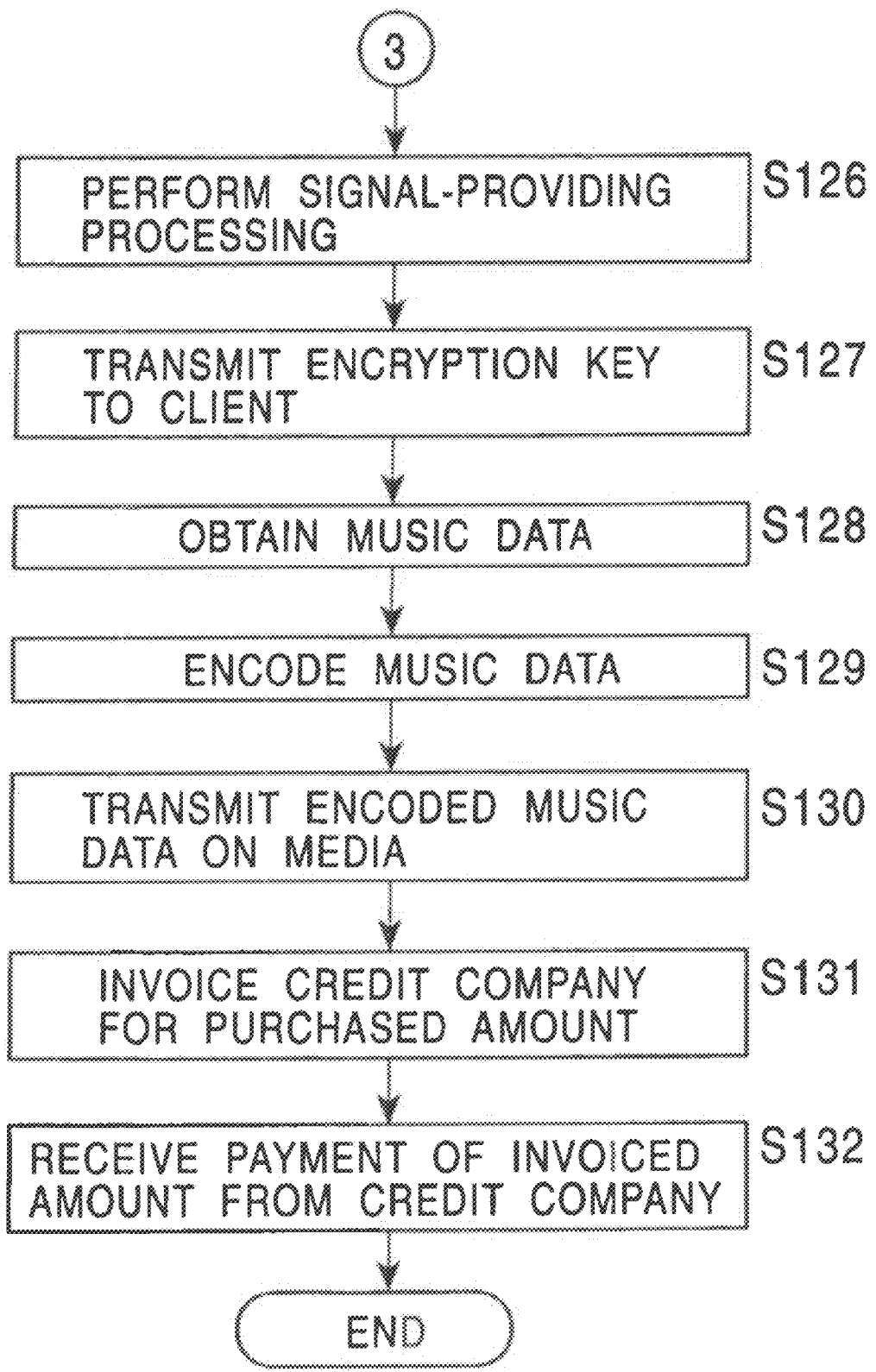
FIG. 26 is another flowchart describing the BTO service processing of the Web server shown in FIG. 1.

The processing in steps S71 through S94 in FIGS. 21 through 23 is basically the same processing as the processing in steps S1 through S24 in FIGS. 10 through 12, and the processing in steps S111 through S132 in FIGS. 24 through 26 is basically the same processing as the processing in steps S31 through S54 in FIGS. 13 through 15.

Note however, that in step S92 of FIG. 23 corresponding to step S22 of FIG. 12, a processing is employed wherein the encoded music data is received by the CPU 52 via the Internet 311, instead of the processing wherein the media is delivered. The CPU 52 temporarily stores the received music data to the hard disk of the hard disk drive 60. Then, in step S93, the music data is read out from the hard disk, and decoded using the encryption key received in step S91, and played.

On the other hand, in the processing at the Web server 321 side, instead of the processing of recording the encoded music data to the media corresponding to step S50 in FIG. 15, processing is executed in step S130 for transmitting the encoded music data via the Internet 311. Then, the processing of steps S51 and S52 in FIG. 15 are omitted.

Other processing is the same as the above-described example.

Figure 27:
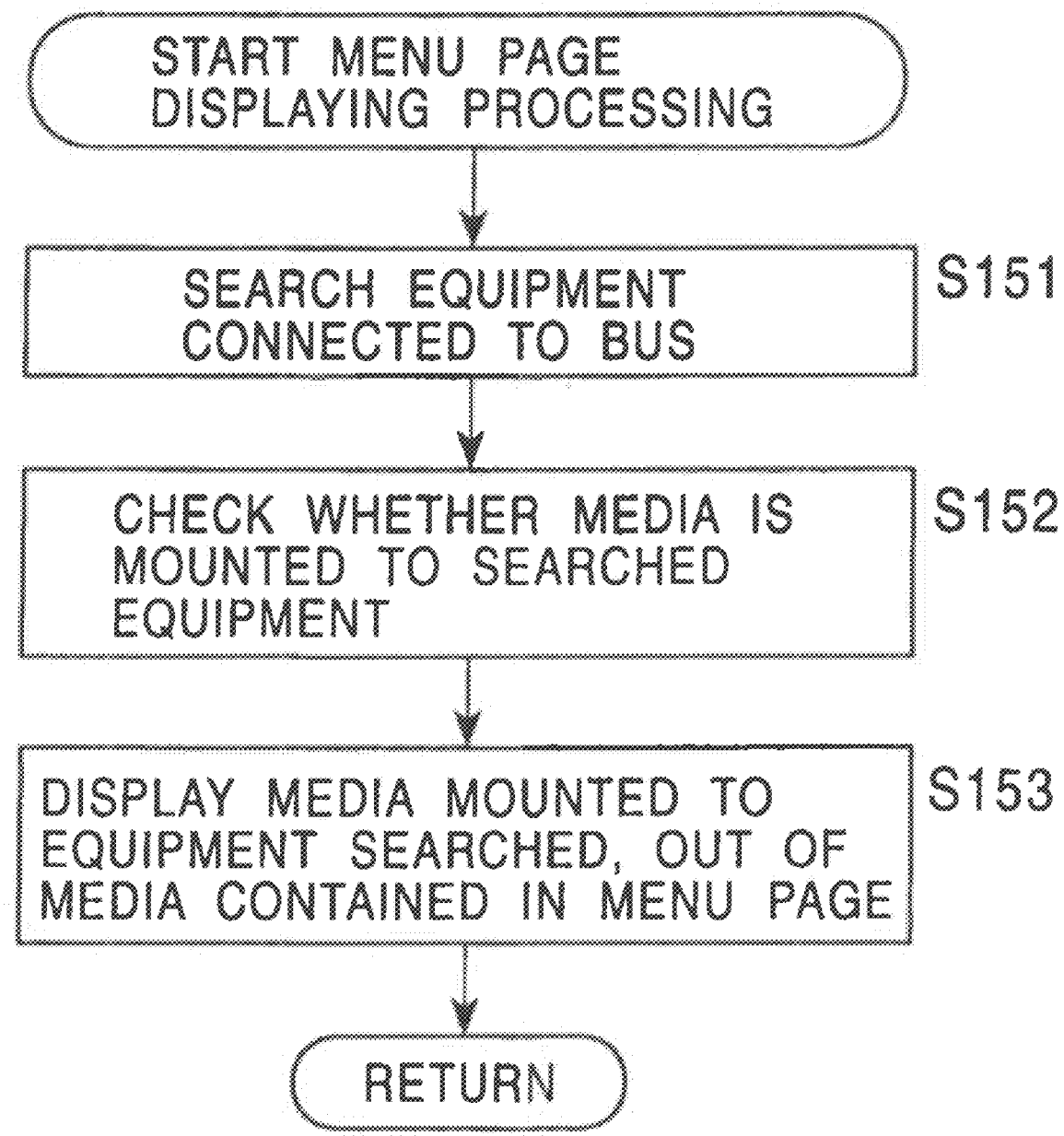
FIG. 27 is a flowchart describing the details of the menu page display processing in step S73 shown in FIG. 21.

Also, at the time of transmitting the music data via the Internet 311 to the client 301 for recording to a medium, the menu page display processing in step S73 of FIG. 21 may be performed as shown in the flowchart in FIG. 27.

That is, in this example, in step S151, the CPU 52 executes processing for searching for devices connected to the 1394 serial bus 305. This search can be performed by reading the global unique IDs stored in the configuration ROM which each device connected to the 1394 serial bus 305 has. This global unique ID contains information for specifying the type of device, and from that information judgement can be made regarding whether each device has functions of recording to media or not.

Also, in step S152, the CPU 52 performs processing of checking whether or not the media is mounted to the device searched in step S151. This processing can be made by a status inquiry from the CPU 52 to each device. In step S153, the CPU 52 displays only the media mounted to devices detected by the search in step S151 and S152, out of the media included in the menu page 401 (FIG. 16) transmitted from the Web server 321. For example, in the event that with the system in FIG. 1, a mini-disk and CD-R are respectively mounted to the MD player 302 and the CD player 304, and a memory stick is not mounted to any of the devices connected to the 1394 serial bus 305, only the buttons 402 corresponding to Audio CD and MD are displayed on the screen shown in FIG. 16, and the MS Walkman is not displayed. Or, even in the event that it is displayed, it is rendered not selectable.

Thus, a case wherein music data cannot be downloaded due to media not being mounted to the corresponding device at the client 301 side, can be prevented in a sure manner.

Figure 28:
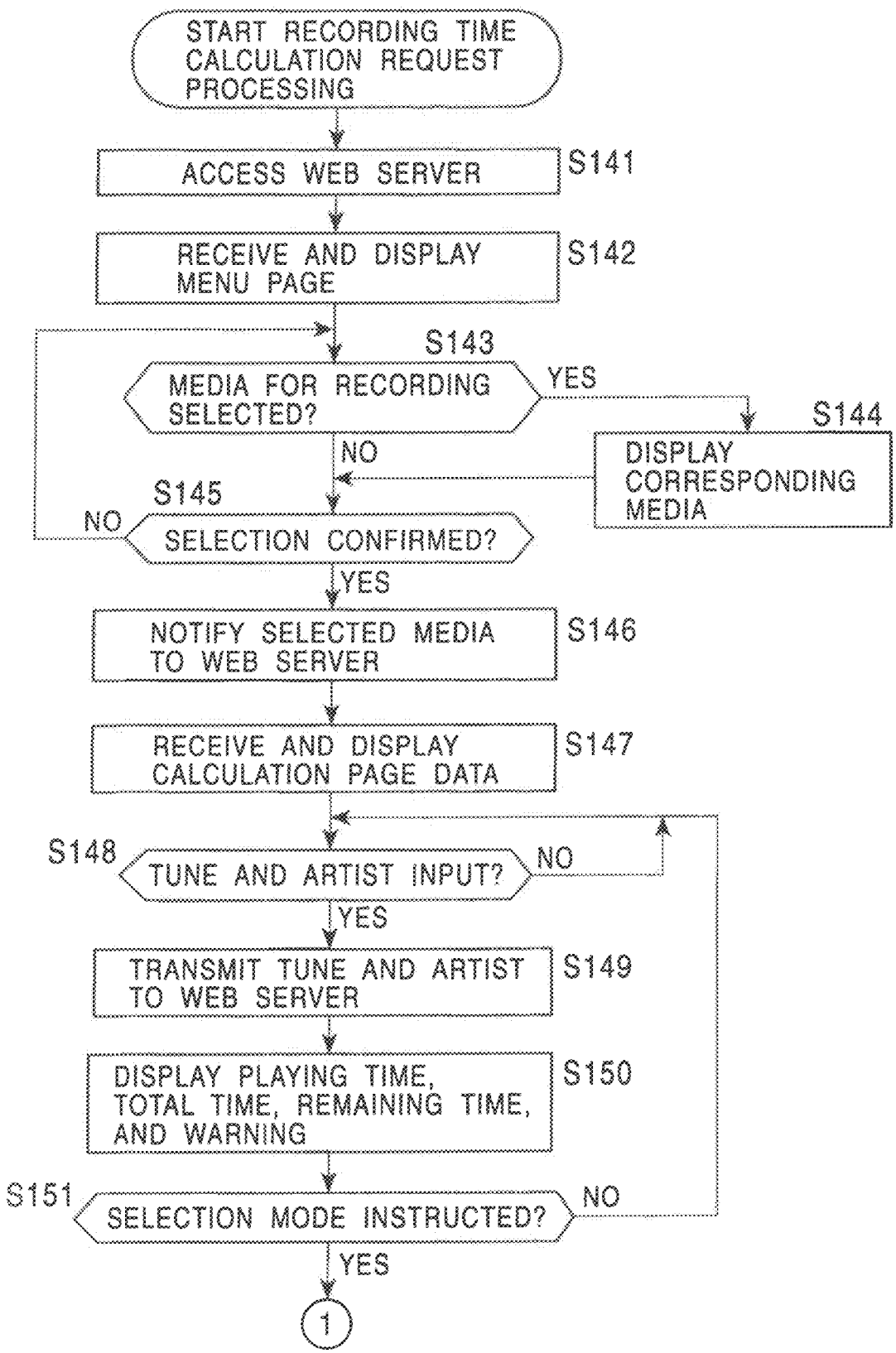
FIG. 28 is a flowchart describing the recording time calculating request processing of the client shown in FIG. 1.
Figure 29:
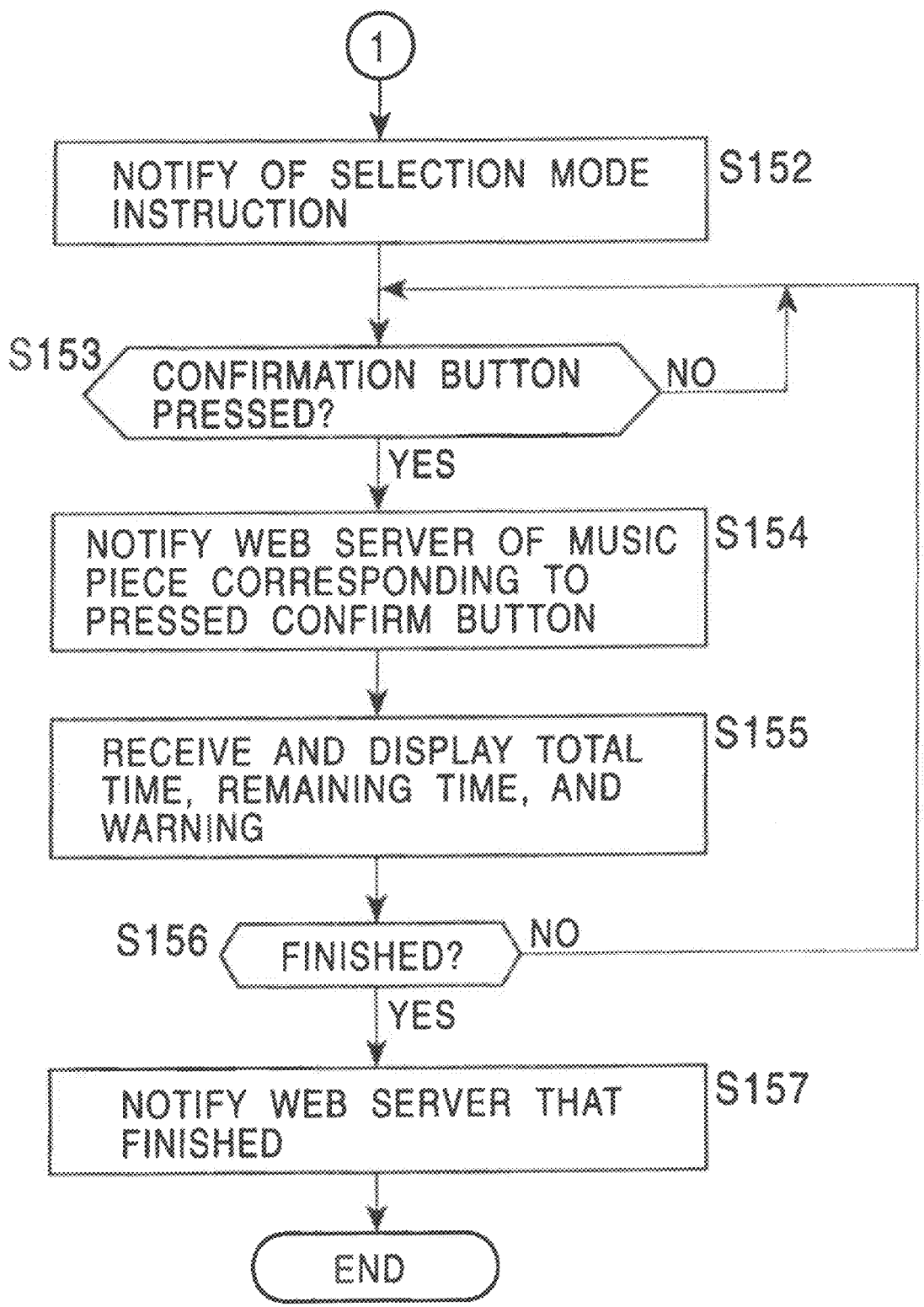
FIG. 29 is another flowchart describing the recording time calculating request processing of the client shown in FIG. 1.
Figure 30:
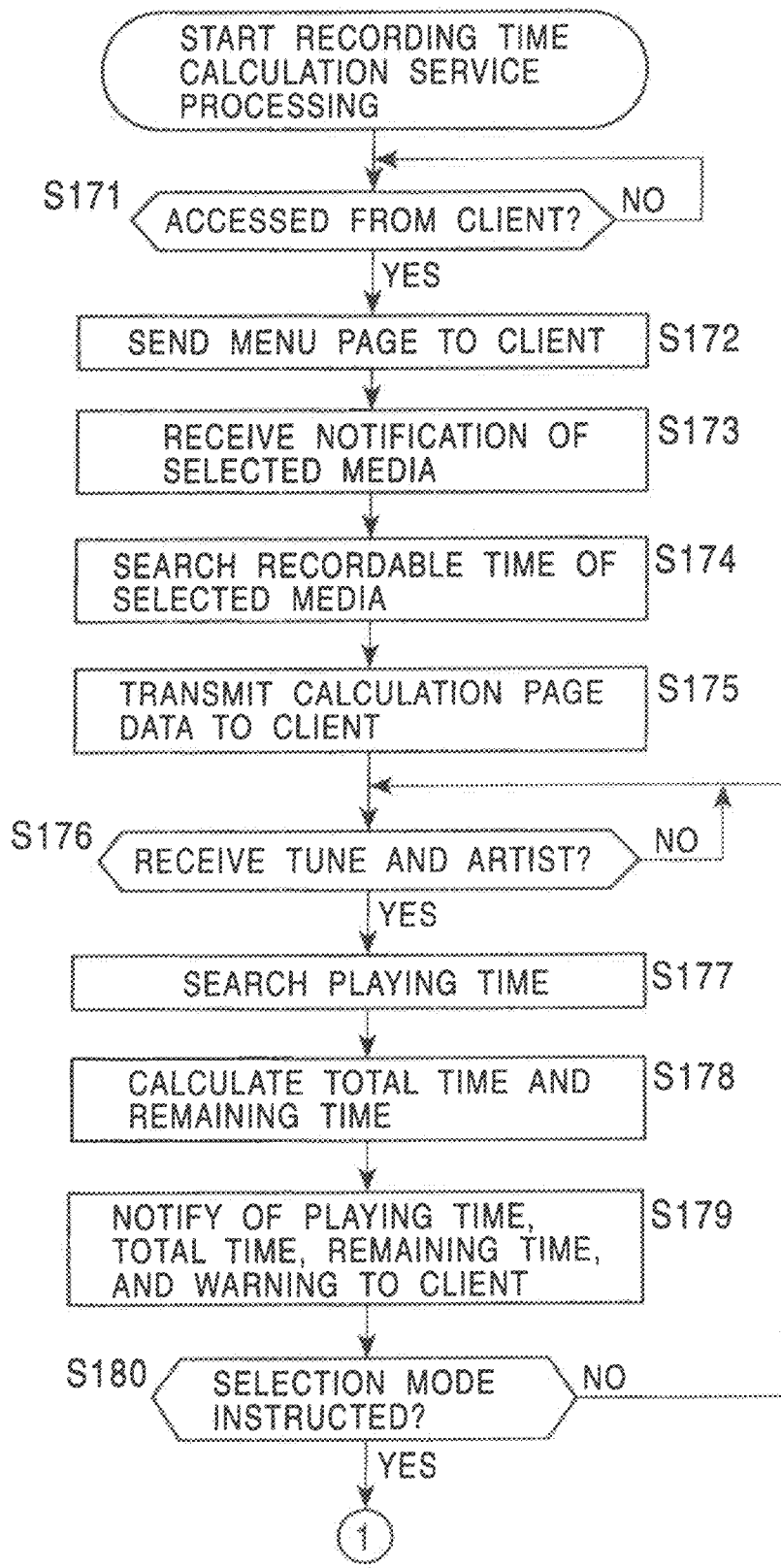
FIG. 30 is a flowchart describing the recording time calculating service processing of the Web server shown in FIG. 1.
Figure 31:
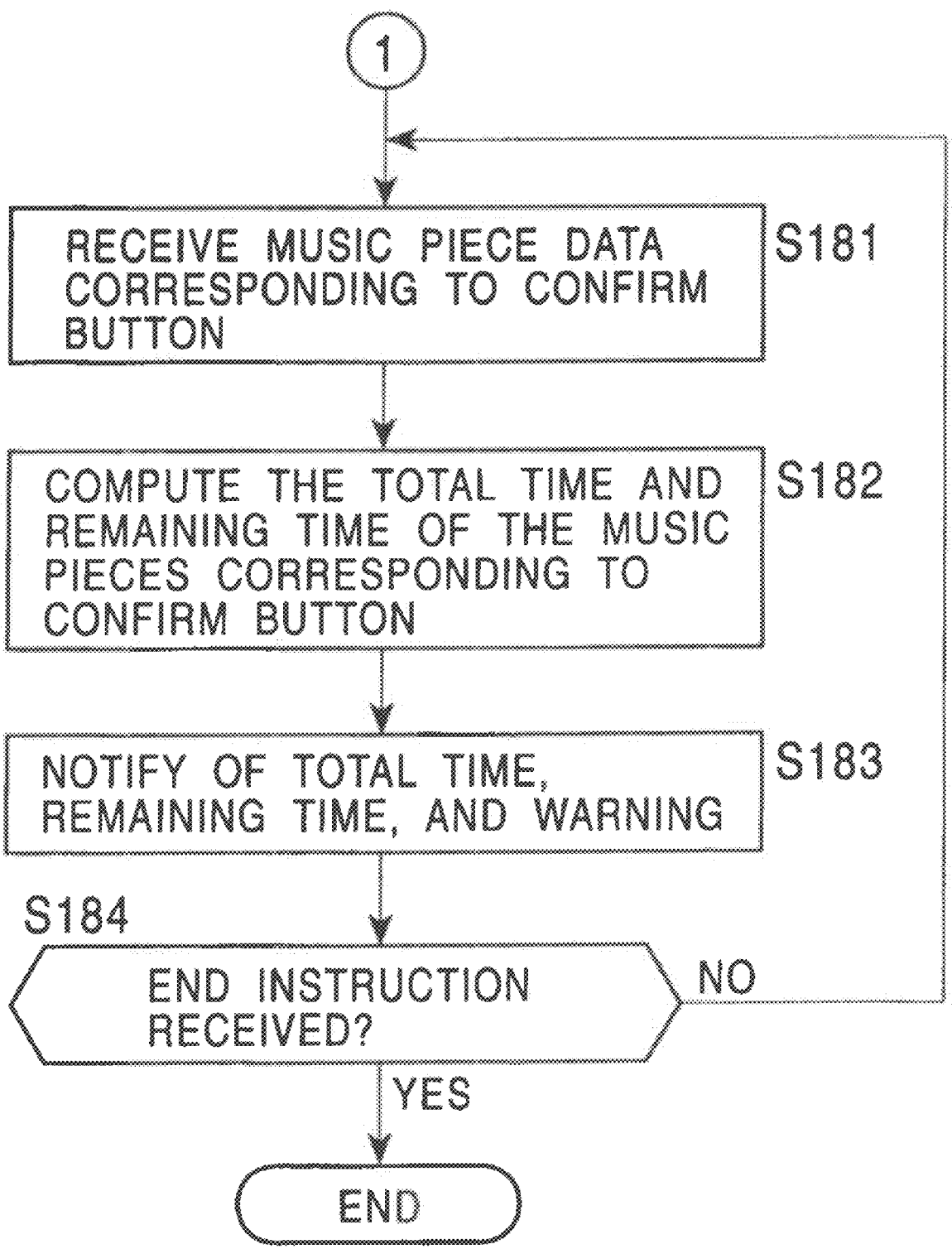
FIG. 31 is another flowchart describing the recording time calculating service processing of the Web server shown in FIG. 1.

In the above description, an example is given wherein music data is provided, but an arrangement may be made wherein music data is not provided, rather, a service is provided simply for calculating the recording time for the music media. The flowcharts in FIGS. 28 through 31 represent an example of processing in this case. The flowcharts in FIGS. 28 and 29 represent the processing at the client 301 side, and the flowcharts in FIGS. 30 and 31 represent the processing at the Web server 321 side.

In step S141, in the event of an instruction from the user, the CPU 52 of the client 301 executes processing to access the Web server 321. The Web server 321 stands by in step S171 until accessed by the client 301, and once accessed proceeds to step S172, where it reads out the menu page data stored in the storing unit 378, and transmits this to the client 301.

Figure 32:
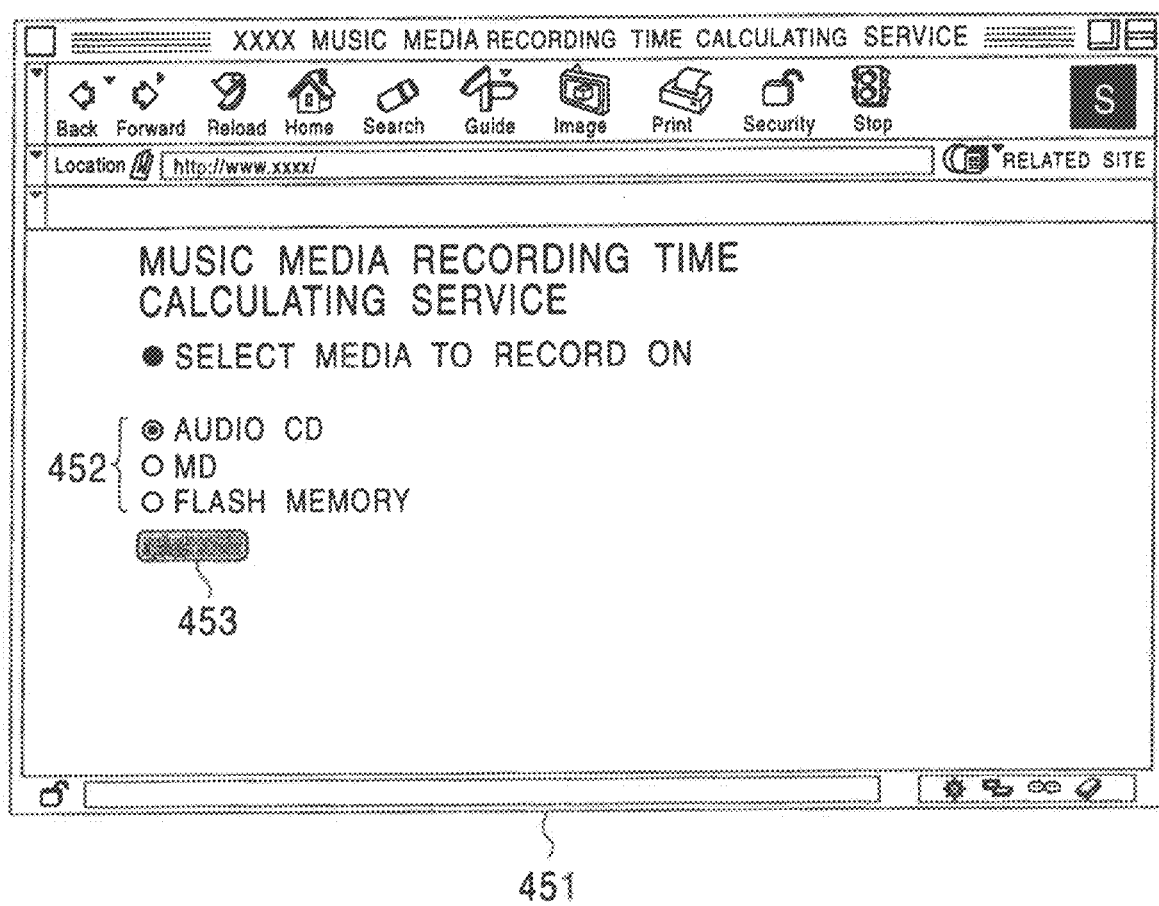
FIG. 32 is a diagram illustrating a display example of a menu page of the client shown in FIG. 1.

In step S142, the CPU 52 of the client 301 upon receiving the menu page data transmitted from the Web server 321 outputs this to the liquid crystal display 21, and displays it. Thus, a menu page 451 such as shown in FIG. 32 is displayed on the liquid crystal display 21. This menu page 451 displays a button 452 for selecting the recording media, and a button 453 operated for confirming the selection.

In step S143, the CPU 52 stands by until the recording media is selected, and once selected, executes in step S144 processing for displaying the corresponding media. That is, at the point that media for recording is selected by operating the button 452, the display is changed such that the user can recognize the selection. In step S143, in the event that judgement is made that recording media is not selected, or in the event that in step S144 processing for displaying the corresponding media is completed, the flow proceeds to step S145, and the CPU 52 judges whether or not the selection has been confirmed, i.e., whether or not the button 453 has been operated. In the event that the button 453 has not been operated, the flow returns to step S143, and the subsequent processing is executed repeatedly.

In step S145, in the event that judgement is made that the button 453 has been operated, the flow proceeds to step S146, and the CPU 52 executes processing for notifying the selected media to the Web server 321.

In step S172, upon receiving notification of the media transmitted from the client 301, the CPU 371 of the Web server 321 accesses the recording media recordable time information database 323 in step S174, and searches the recordable time for the selected media. Then, in step S175, the CPU 371 reads out the calculation page data stored in the storing unit 378, and transmits it to the client 301.

Figure 33:
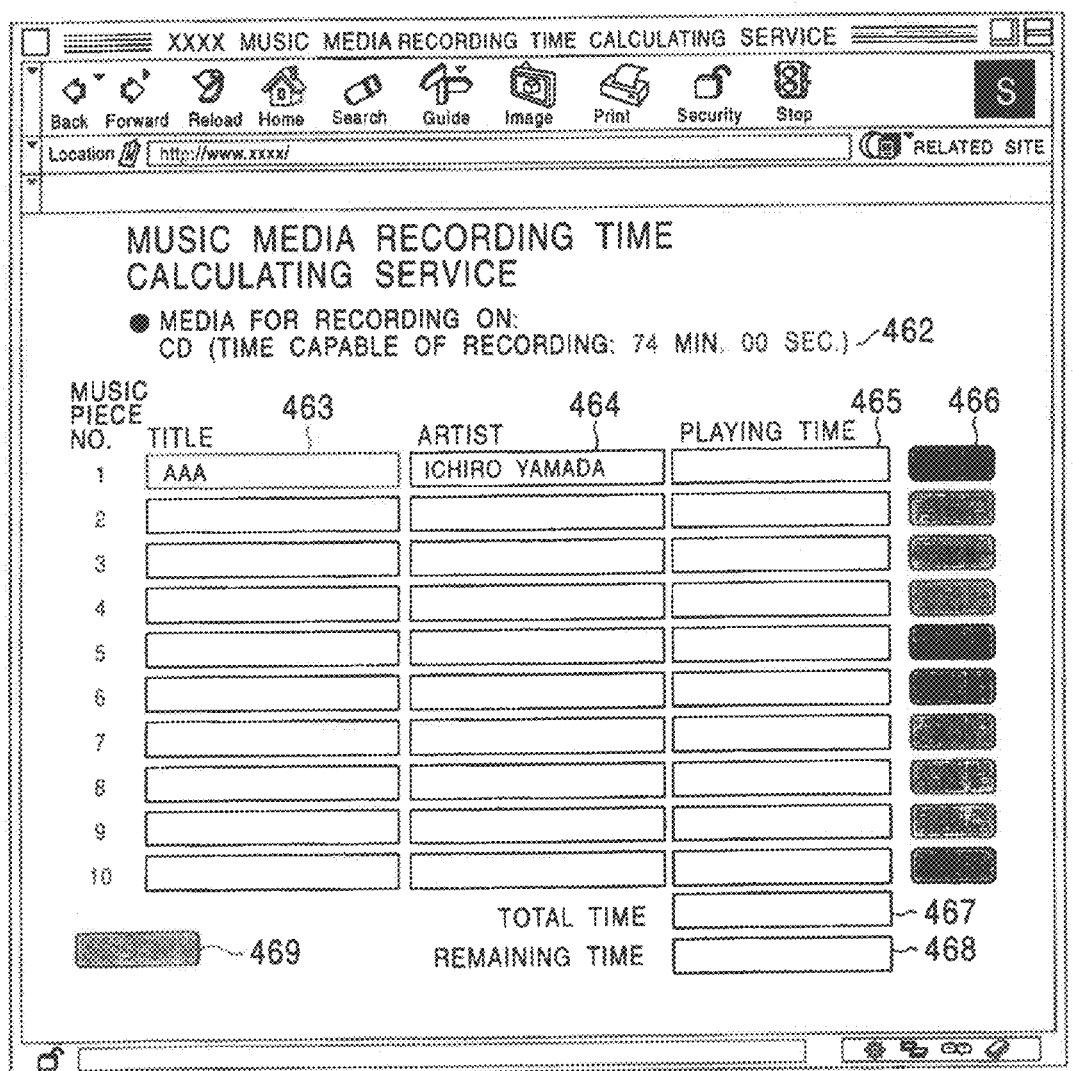
FIG. 33 is a diagram illustrating a display example of the calculating page of the client shown in FIG. 1.

In step S147, upon receiving the calculation page data, the CPU 52 of the client 301 displays this on the liquid crystal display 21. Thus, for example, a calculation page 461 such as shown in FIG. 33 is displayed on the liquid crystal display 21. Displayed in this calculation page 461 is a display space 462 for the recordable time of the specified media, and further an input space 463 for inputting the music piece title and an input space 464 for inputting the artist. FIG. 33 shows the state of the title piece and the artist input. Also displayed are a display space 465 for displaying the playing time of each piece according to the input spaces, and a button 466 operated at the time of confirming the selection.

The button 469 is operated at the time of setting the selection mode. The display space 467 displays the total time of the playing time displayed in the display space 465, and the display space 468 displays the remaining time obtained by subtracting the total time displayed in the display space 467 from the recordable time displayed in the display space 462.

In step S148, the CPU 52 judges whether or not the title piece is input to the input space 463 and the artist is input to the input space 464, and further whether or not the confirming button 466 corresponding to the input spaces has been operated. In the event that the corresponding confirming button 466 has been operated, the flow proceeds to step S149, and the CPU 52 transmits the data of the title piece and artist input to the input spaces 463 and 464, to the Web server 321.

In step S176, the CPU 371 of the Web server 321 stands by until reception of the data of the title piece and artist, and once judgement has been made that the same has been received, the flow proceeds to step S177, the CPU 371 accesses the music piece playing time information database 324, and searches the playing time of the music piece specified by the title piece and artist. In step S178, the CPU 371 calculates the total playing time searched so far, and the remaining time by subtracting the total time from the recordable time of the media searched in step S174. Then, in step S179, the CPU 371 transmits the playing time searched at that time in step S177, and the total time and remaining time calculated in step S178, to the client 301.

Figure 34:
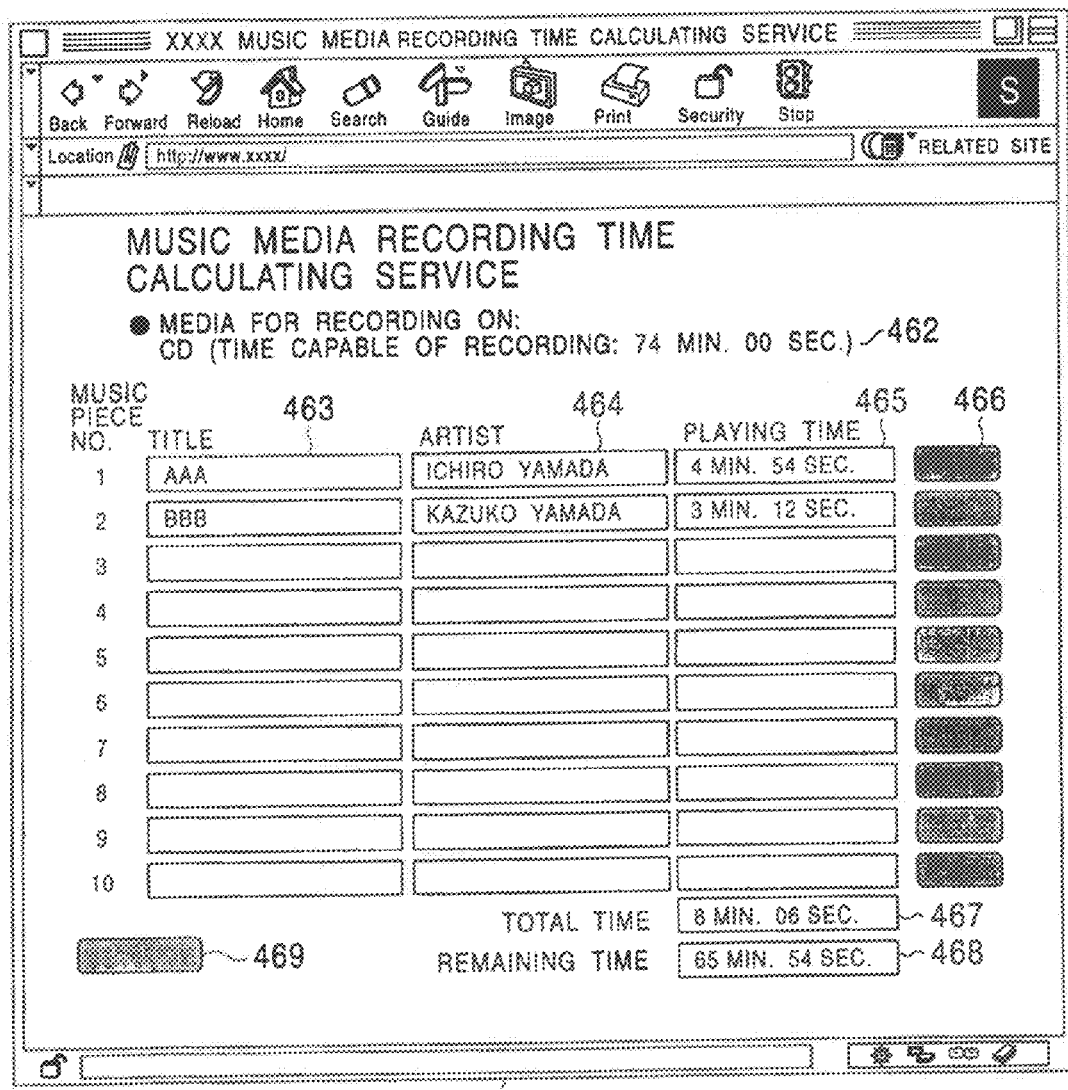
FIG. 34 is a diagram illustrating a display example of the calculating page of the client shown in FIG. 1.

In step S150, upon receiving the playing time, total time, and remaining time transmitted from the Web server 321, the CPU 52 of the client 301 displays these on the calculating page 461 in the display spaces 465, 467, and 468, as shown in FIG. 34. Note that FIG. 34 shows two pieces input. In step S178, the CPU 371 of the Web server 321 judges whether calculating the remaining time yields a negative value or not, i.e., whether or not the remaining time is negative, and in the event that this is a negative value, i.e., in the event that the total time is greater than the recordable time, a warning message is generated. This message is notified to the client 301 in step S179, along with the playing time, total time, and remaining time. Consequently, in the event that such a warning is notified along with the other figures, the calculating page 461 displays a warning message 481 such as "THE TOTAL TIME OF SELECTED MUSIC PIECES HAS EXCEEDED TIME CAPABLE OF RECORDING", as shown in FIG. 35.

In the event that such a warning has been issued, the user must perform processing for omitting certain music data. In the case of performing such processing, the user operates the button 469, and specifies the selection mode. Thus, the CPU 52 judges in step S151 whether or not the selection mode has been instructed (i.e., whether or not the button 469 has been operated), and in the event that this has not been operated, the flow returns to step S148, and subsequent processing is executed repeatedly. Then, in step S151, in the event that judgement is made that the selection mode has been instructed, the flow proceeds to step S152, and the CPU 52 notifies instruction of the selection mode to the Web server 321.

In step S180, the CPU 371 of the web server 321 judges whether or not the selection mode has been instructed, and in the event that this has not been instructed, the flow returns to step S176, and the subsequent processing is executed repeatedly. In the event that judgement is made in step S180 that the selection mode has been instructed, the flow proceeds to step S181.

In step S153, the CPU 52 of the client 301 stands by until the confirming button 466 is operated, and in the event that this has been operated, the flow proceeds to step S154, and the music price corresponding to the operated confirming button 466 is transmitted to the Web server 321.

In step S181, at the point that the Web server 321 receives the music piece data corresponding to the confirming button 466 transmitted from the client 301, in step S182, the total time and remaining time corresponding to the pieces regarding which the confirming button 466 has been operated up to then are computed. Then, in step S183, the total time and remaining time are notified to the client 301. In this case as well, in the event that the total time exceeds the recordable time, a warning is notified at the same time.

In step S155, upon receiving the total time and remaining time transmitted from the Web server 321, the CPU 52 of the client 301 displays this on the liquid crystal display 21. In the event that a warning is sent at the same time, this is displayed as well.

In step S156, judgement is made by the CPU 52 regarding whether or not ending has been instructed, and in the event that this has not been instructed, the flow returns to step S153, and the subsequent processing is executed repeatedly. Thus, the user selects certain pieces of the music pieces displayed on the calculating page 461 by operating the confirming button 466, and the total time and remaining time of the newly-selected pieces are displayed in the display space 467 and display space 468, respectively.

Thus, in the event that information of recordable music data has been obtained for the specified media. The user operates the keyboard 4 or the stick-type pointing device 5, and instructs ending the processing. Then, in step S156, the CPU 52 judges whether or not ending the processing has been instructed, and in the event that this has not been instructed, the flow returns to step S153, and the subsequent processing is executed repeatedly. In step S156, in the event that judgement is made that ending the processing has been instructed, the flow proceeds to step S157, and the CPU 52 notifies the ending the processing to the Web server 321.

On the other hand, in step S184, the Web server 321 judges whether or not instruction of ending the processing has been received from the client 301, and in the event that judgement is made that this has not been received, the flow returns to step S181, and the subsequent processing is executed repeatedly. On the other hand, in step S184, in the event that judgement is made in step S184 that instruction of ending the processing has been received, the CPU 371 ends the recording time calculating processing.

Thus, in this example, the user uses the Web server 321 to confirm which music pieces can be efficiently (without lack or excess) recorded on a given media, and subsequent recording processing is performed by the user using the device connected to the 1394 serial bus 305.

Figure 36:
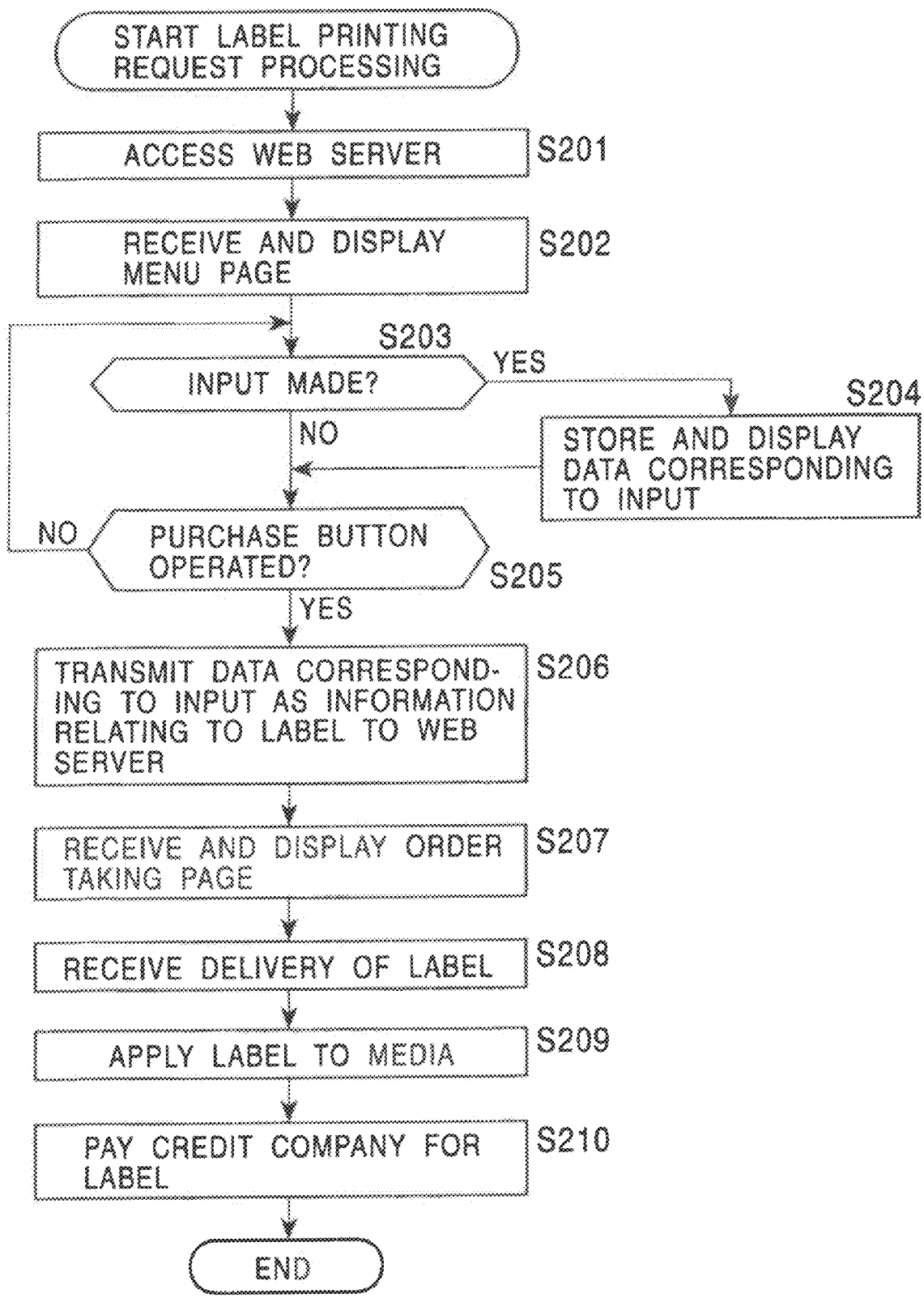
FIG. 36 is a flowchart describing the label printing request processing of the client shown in FIG. 1.
Figure 37:
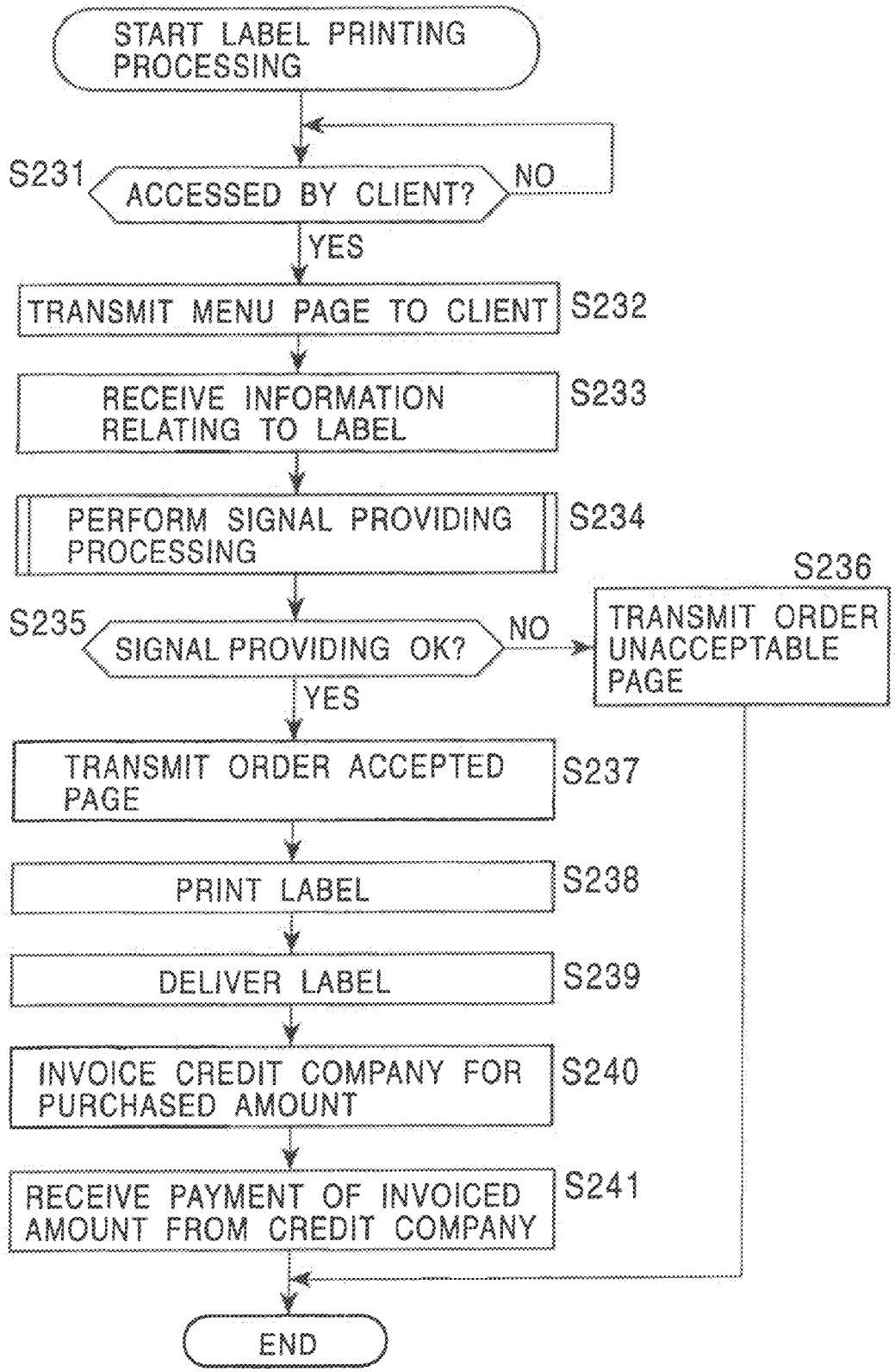
FIG. 37 is a flowchart describing the label printing processing of the Web server shown in FIG. 1.

In the event that the user records music data on a certain media in this way, it is preferable to apply a label (jacket) to the media, a task which was conventionally performed by hand. However, with the present system, this label can also be printed by the Web server 321. Next, the processing in this case will be described with reference to the flowcharts in FIGS. 36 and 37. The processing in FIG. 36 represents the processing at the client 301 side, and the processing in FIG. 37 represents the processing at the Web server 321 side.

In step S201, upon receiving instruction from the user, the CPU 52 of the client 301 executes processing to access the Web server 321. On the other hand, in step S231, the Web server 321 stands by until being accessed from the client 301, and at the point of being accessed, the flow proceeds to step S232. Incidentally, in the event that this label printing processing is to be performed following the recording time calculating processing in the above-described FIGS. 28 through 31, the processing of the steps S201 and S231 may be omitted.

Figure 38:
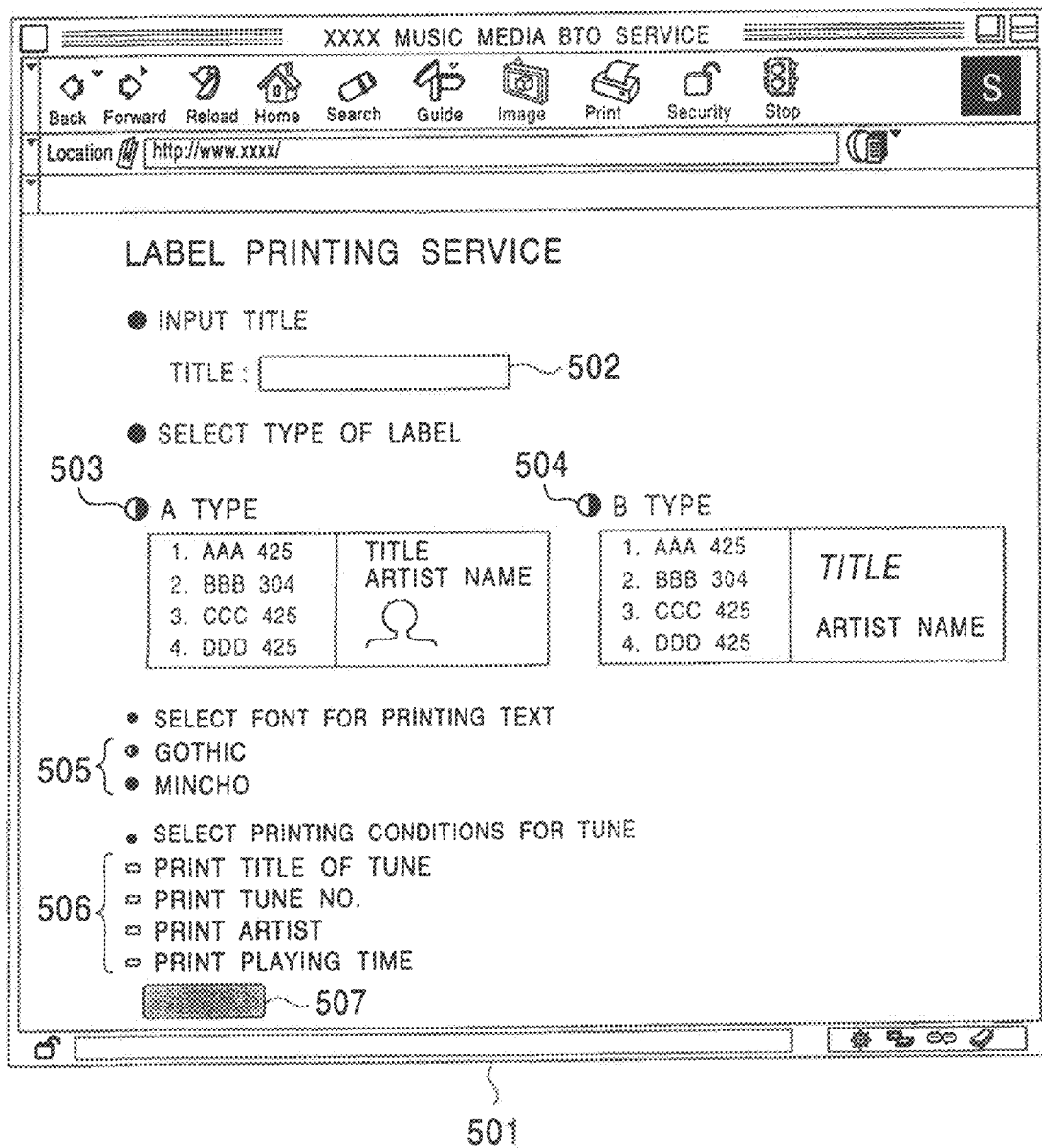
FIG. 38 is a diagram illustrating a display example of the menu page of the client 301 shown in FIG. 1.

In step S232, the CPU 371 reads out the menu page data from the storing unit 378, and transmits this to the client 301. In step S202, the CPU 52 of the client 301 receives the data of the menu page transmitted from the Web server 321, and displays this on the liquid crystal display 21. Thus, a menu page 501 such as shown in FIG. 38 for example is displayed on the liquid crystal display 21. The user inputs the title in the menu page 501. In addition to the input space 502, buttons 503 and 504 for selecting the type of label are also displayed here. The user can select printing of the A type label by selecting the button 503, or select printing of the B type label by selecting the button 504.

The menu page 501 also displays a button 505 for selecting the printing font for the text, and a button 506 for selecting the printing state of the music piece. In this example, the printing fonts to be selected from are Gothic and Mincho, and the music piece printing conditions consists of allowing selection of whether or not to print the title piece No., artist, and playing time. Also, the button 507 is operated at the time of purchasing such a label. The user inputs the necessary information for printing, based on the GUI of the menu page 501. In the event that this label printing processing is to be performed following the above-described calculating processing, the title, artist, etc., have already been input, so there is no need to input again, but in the event that the label printing processing is to be performed independently from the calculating processing, there is the need for input of the information of the title, artist, etc., again.

Now, in step S203, the CPU 52 of the client 301 judges whether or not input has been made, and in the event that input has been made, the flow proceeds to step S204, and the data corresponding to input is stored in the RAM 54, and also processing for displaying the corresponding display on the menu page 501 is executed. For example, at the time of input of the title to the input space 502, this is stored to the RAM 54, and also the characters corresponding to the input are displayed in the display space 502.

In step S203, in the event that judgement is made that there has been no input, or in the event that judgement is made in step S204 that the processing of storing data corresponding to input and the processing of displaying have ended, the flow proceeds to step S205, where the CPU 52 judges whether or not the purchasing button 507 has been operated, and in the event that it has not been operated, the flow returns to step S203 and the subsequent processing is executed repeatedly.

In step S205, in the event that judgement is made that the purchasing button 507 has been pressed, the flow proceeds to step S206, and the CPU 52 executes processing for transmitting data corresponding to the input as information relating to the label, to the Web server 321.

In step S233, upon receiving the information relating to the label, the CPU 371 of the Web server 321 executes signal-providing processing. This signal-providing processing is executed by accessing the credit company 441, in the same manner as the above-described case.

In step S235, the CPU 371 judges whether or not the signal-providing results were not satisfactory, the flow proceeds to step S236, the CPU 371 transmits an order unacceptable page to the client 301, and the processing ends. In the event that the signal-providing is satisfactory, the CPU 371 proceeds to step S237, and an order accepted page is transmitted to the client 301.

Subsequently, the flow proceeds to step S238, the CPU 371 accesses the label information database 327, uses the GUI of the menu page 501 to take in information of the label specified by the user, supplies the contents taken in to the printing unit 380, and prints the label (jacket). In step S239, the administrator of the Web server 321 delivers the label printed in step S238 to the user of the client 301.

Subsequently, in step S240, the CPU 371 invoices the credit company 441 of the bill, and in step S241, receives payment of the invoice amount from the credit company.

On the other hand, upon receiving the order accepted page from the web server 321 in step S207, the CPU 52 of the client 301 displays this on the liquid crystal display 21. Thus, the user can confirm whether or not the order has been accepted. In the event that the order has been accepted, the label is delivered by post or courier, as described above, so the user of the client 301 receives the label in step S208, and in step S209 applies the delivered label to the media as necessary. Then, in step S210, the user pays the credit company 441 for the label.

As described above, the user can record music data which he/she has edited onto his/her own media, and can apply a neatly printed label onto that recorded media, thereby obtaining a media with a desirable appearance. Of course, this media can be used personally, or may be used for other purposes such as a gift to a friend.

The above-described series of the processing can be executed with hardware, or can be executed with software. In the event of executing the series of the processing with software, programs comprising this software may be installed in a computer assembled into dedicated hardware, or installed a program storing medium into a common-use personal computer for example, which is capable of executing various functions by installing various programs thereto.

The program storing medium which stores programs (e.g., WWW browser programs) which are installed into the computer and are placed in a computer-executable state, comprises, as shown in FIGS. 8 and 9, packaged media such as magnetic discs 231 and 391 (including floppy disks), optical disks 232 and 392 (including CD-ROMs (Compact Disk Read-Only Memory) DVDs (Digital Versatile Disk)), magneto-optical disks 233 and 393 (including MDs (mini-disk), and semiconductor memory 234 and 394 and so forth, and also ROM 71 and 372 where programs are temporarily or permanently stored, hard disks of the storing unit 378 or the hard disk drive 60, and so forth. Storing of the programs to the program storing medium is performed using the Internet 311, or wire or wireless communication media such as local area networks, digital satellite broadcast, etc., via interfaces such as routers, modem 66, communication unit 379, as necessary.

Note that the steps describing the program recorded on the program storing medium include, of course, processing performed in time-sequence following the described order, but are not restricted to this, and also include processing executed in parallel or independently even without being performed in time-sequence.

It should also be understood that in the present specification, the term "system" refers to the entire equipment configured of the multiple devices.

As described above, with the information processing apparatus according to one aspect of the present invention, the information processing method according to another aspect of the present invention, and the program stored in the program storing medium according to still another aspect of the present invention, capacity information of capacity of information to be provided is obtained from another information processing device via a network and displayed, so request of recording of given information to a recording medium can be made based on this display, and accordingly, information can be efficiently recorded on the recording medium without excess or lack.

With the information processing apparatus according to further aspect of the present invention, the information processing method according to yet further aspect of the present invention, and the program stored in the program storing medium according to yet further aspect of the present invention, capacity information corresponding to specified provided information is obtained and notified to other information processing devices via the network, so that the provided information is recorded on the recording medium, thereby enabling a recording medium with provided information recorded thereupon in an efficient manner to be provided in a sure manner.

With the information providing system according to yet further aspect of the present invention, a second information processing device obtains capacity information of provided information specified by a first information processing device and notifies this to the first information processing device, and the second information processing device records the provided information specified by the first information processing device in a recording medium, thereby realizing a system capable of providing in a sure manner a recording medium with provided information recorded thereupon in an efficient manner.

With the information processing apparatus according to yet further aspect of the present invention, the information processing method according to yet further aspect of the present invention, and the program recorded in the program storing medium according to yet further aspect of the present invention, capacity information relating to the capacity of information from other information processing devices is obtained via a network and displayed, and accordingly, information can be recorded efficiently on the recording medium without excess or lack.

With the information processing apparatus according to yet further aspect of the present invention, the information processing method according to yet further aspect of the present invention, and the program stored in the program storing medium according to yet further aspect of the present invention, capacity information of information specified by other information processing devices is obtained and notified to other information processing devices, so information can be efficiently recorded to the recording medium with regard to other information processing devices.

With the information processing system according to yet further aspect of the present invention, a second information processing device obtains capacity information corresponding to information specified by a first information processing device, and notifies the first information processing device, thereby realizing a system capable of efficiently recording information on the recording medium with the first information processing device.

With the information processing apparatus according to yet further aspect of the present invention, the information processing method according to yet further aspect of the present invention, and the program stored in the program storing medium according to yet further aspect of the present invention, control is made of a GUI display based on GUI data for specifying printing conditions for a label to be applied to the recording medium obtained from other information processing devices via the network, thereby enabling label printing conditions to be specified and printing to be requested in a speedy and simple manner.

With the information processing apparatus according to yet further aspect of the present invention, the information processing method according to yet further aspect of the present invention, and the program stored in the program storing medium according to yet further aspect of the present invention, GUI data for specifying conditions for printing the label to be applied to the recording medium is transmitted to other information processing devices, the conditions input based on the GUI are obtained via the network, and the label is printed under the obtained printing conditions, so labels can be provided to users of other information processing devices, in a simple and sure manner.

With the information processing system according to yet further aspect of the present invention, GUI data specifying the printing conditions of the label to be applied to the recording medium are transmitted from the second information processing device to the first information processing device, conditions are input at the first information processing device based on the GUI display, and the input conditions are transmitted to the second information processing device, and label printing is performed, thereby realizing a system wherein the printed label can be provided to the user of the first information processing device in a simple and sure manner.

The invention claimed is:

1. A recording apparatus comprising:
   means for recording music on a recording media;
   means for identifying at least one music piece to be recorded on the recording media;
   means for determining whether the at least one music piece can be recorded on the recording media based on the available storage capacity of the recording media;
   means for issuing a warning when the means for determining determines that the at least one music piece cannot be recorded on the recording media; and
   means for receiving a print label selection that corresponds to one of a plurality of print label templates for the recording media,
   wherein at least two of the plurality of print label templates define different layouts, the different layouts specifying different locations of a print label in which an image associated with one or more of the at least one music piece is to be printed.

2. A recording apparatus according to claim 1, wherein the recording media is an optical disk.

3. A recording apparatus according to claim 1, wherein the means for issuing a warning displays the warning on a graphical user interface.

4. A recording apparatus according to claim 1, wherein the selected print label includes a playing time, or a title, of one or more of the at least one music piece to be recorded on the recording media.

5. A method according to claim 1, wherein the image has a predetermined association with one or more of the at least one music piece.

6. A method according to claim 1, wherein the different layouts specify different locations of the print label in which a same image associated with the one or more of the at least one music piece is to be printed.

7. A recording apparatus comprising:
   a recorder configured to record music on a recording media;
   a controller configured to:
      identify at least one music piece to be recorded on the recording media;
      determine whether the at least one music piece can be recorded on the recording media based on the available storage capacity of the recording media;
      issue a warning when the controller determines that the at least one music piece cannot be recorded on the recording media; and
      receive a print label selection that corresponds to one of a plurality of print label templates for the recording media,
      wherein at least two of the plurality of print label templates define different layouts, the different layouts specifying different locations of a print label in which an image associated with one or more of the at least one music piece is to be printed.

8. A recording apparatus according to claim 7, wherein the recording media is an optical disk.

9. A recording apparatus according to claim 7, wherein the controller displays the warning on a graphical user interface.

10. A recording apparatus according to claim 7, wherein the selected print label includes a playing time, or a title, of one or more of the at least one music piece to be recorded on the recording media.

11. A recording apparatus according to claim 7, wherein the image has a predetermined association with one or more of the at least one music piece.

12. A recording apparatus according to claim 7, wherein the different layouts specify different locations of the print label in which a same image associated with the one or more of the at least one music piece is to be printed.

13. A method of a recording apparatus for processing music, comprising:
   identifying at least one music piece to be recorded on the recording media;
   determining, by the recording apparatus, whether the at least one music piece can be recorded on the recording media based on the available storage capacity of the recording media;
   issuing a warning when the determining determines that the at least one music piece cannot be recorded on the recording media; and
   receiving a print label selection that identifies one of a plurality of print label templates for the recording media,
   wherein at least two of the plurality of print label templates define different layouts, the different layouts specifying different locations of a print label in which an image associated with one or more of the at least one music piece is to be printed.

14. A method according to claim 13, wherein the recording media is an optical disk.

15. A method according to claim 13, wherein the issuing a warning displays the warning on a graphical user interface.

16. A method according to claim 13, wherein the selected print label includes a playing time, or a title, of one or more of the at least one music piece to be recorded on the recording media.

17. A method according to claim 13, wherein the image has a predetermined association with one or more of the at least one music piece.

18. A method according to claim 13, wherein the different layouts specify different locations of the print label in which a same image associated with the one or more of the at least one music piece is to be printed.

19. A non-transitory computer-readable storage medium having embedded therein instructions, which when executed by a computer, cause the computer to perform a method, comprising:

identifying at least one music piece to be recorded on the recording media;

determining whether the at least one music piece can be recorded on the recording media based on the available storage capacity of the recording media;

issuing a warning when the determining determines that the at least one music piece cannot be recorded on the recording media; and receiving a print label selection that identifies one of a plurality of print label templates for the recording media, wherein at least two of the plurality of print label templates define different layouts, the different layouts specifying different locations of a print label in which an image associated with one or more of the at least one music piece is to be printed.

* * * * *